(12) United States Patent
Seo et al.

(10) Patent No.: US 12,533,026 B2
(45) Date of Patent: Jan. 27, 2026

(54) ELECTRONIC DEVICE AND METHOD OF MEASURING OXYGEN SATURATION BASED ON USER CONTEXT IN THE ELECTRONIC DEVICE

(71) Applicant: Samsung Electronics Co., Ltd., Suwon-si (KR)

(72) Inventors: Hyejung Seo, Suwon-si (KR); Seongmin Je, Suwon-si (KR); Suho Lee, Suwon-si (KR); Hyunjun Jung, Suwon-si (KR); Jongmin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 495 days.

(21) Appl. No.: 17/712,689

(22) Filed: Apr. 4, 2022

(65) Prior Publication Data

US 2023/0000353 A1 Jan. 5, 2023

Related U.S. Application Data

(63) Continuation of application No. PCT/KR2022/004403, filed on Mar. 29, 2022.

(30) Foreign Application Priority Data

Jul. 5, 2021 (KR) .......................... 10-2021-0088037

(51) Int. Cl.
*A61B 5/00* (2006.01)
*A61B 5/1455* (2006.01)
(Continued)

(52) U.S. Cl.
CPC .......... *A61B 5/0022* (2013.01); *A61B 5/0004* (2013.01); *A61B 5/14552* (2013.01);
(Continued)

(58) Field of Classification Search
CPC . A61B 5/0022; A61B 5/0004; A61B 5/14552; A61B 2560/0257; G16H 10/60
See application file for complete search history.

(56) References Cited

U.S. PATENT DOCUMENTS 6,104,947 A 8/2000 Heikkila et al.
6,463,310 B1 10/2002 Swedlow et al.
(Continued)

FOREIGN PATENT DOCUMENTS

JP H09-509877 A 10/1997
JP 2006-334369 A 12/2006
(Continued)

OTHER PUBLICATIONS

International Search Report with Written Opinion and English translation dated Jul. 6, 2022; International App. No. PCT/KR2022/004403.

(Continued)

*Primary Examiner* — Carl H Layno
*Assistant Examiner* — Maria Catherine Anthony
(74) *Attorney, Agent, or Firm* — Jefferson IP Law, LLP

(57) ABSTRACT

An electronic device is provided. The electronic device includes a communication module, a display, a memory, a biosensor configured to measure oxygen saturation, and at least one processor. The at least one processor may be configured to obtain electronic medical record (EMR) data from an external server through the communication module, identify oxygen saturation-related medical records based on the EMR data, based on occurrence of an event, determine a specified oxygen saturation measurement period and a specified reference oxygen saturation range based on the oxygen saturation-related medical records, measure oxygen saturation based on the specified oxygen saturation measurement period by using the biosensor, identify whether the (Continued)

measured oxygen saturation satisfies the specified reference oxygen saturation range, and display the measured oxygen saturation and information indicating whether the measured oxygen saturation satisfies the specified reference oxygen saturation range on the display.

20 Claims, 10 Drawing Sheets

(51) Int. Cl.
  *G16H 10/60* (2018.01)
  *G16H 50/20* (2018.01)
(52) U.S. Cl.
  CPC ............... *A61B 5/681* (2013.01); *A61B 5/72* (2013.01); *A61B 5/742* (2013.01); *G16H 10/60* (2018.01); *G16H 50/20* (2018.01); *A61B 2560/0257* (2013.01); *A61B 2560/0475* (2013.01)

(56) References Cited

U.S. PATENT DOCUMENTS

| | | |
|---|---|---|
| 2003/0009090 A1 | 1/2003 | Jeon et al. |
| 2013/0278414 A1 | 10/2013 | Sprigg et al. |
| 2017/0071550 A1* | 3/2017 | Newberry .......... A61B 5/14546 |
| 2017/0181678 A1* | 6/2017 | Newberry .............. A61B 5/743 |
| 2017/0281065 A1* | 10/2017 | Newberry ............ A61B 5/1455 |
| 2018/0153440 A1 | 6/2018 | Lee et al. |
| 2018/0247713 A1 | 8/2018 | Rothman |
| 2018/0279966 A1 | 10/2018 | Park et al. |
| 2018/0344229 A1 | 12/2018 | Cronin et al. |
| 2019/0328294 A1 | 10/2019 | Foresto |
| 2020/0268263 A1 | 8/2020 | Lee et al. |
| 2020/0381092 A1* | 12/2020 | Granvold ............... G16H 10/60 |
| 2021/0366260 A1 | 11/2021 | Lee |

FOREIGN PATENT DOCUMENTS

| | | | | |
|---|---|---|---|---|
| JP | 2010-227640 A | 10/2010 | | |
| KR | 10-2002-0081763 A | 10/2002 | | |
| KR | 10-2009-0127986 A | 12/2009 | | |
| KR | 10-2011-0039168 A | 4/2011 | | |
| KR | 10-2014-0037325 A | 3/2014 | | |
| KR | 20160084783 A | * 7/2016 | ............... A61B 5/02 |
| KR | 10-2016-0133799 A | 11/2016 | | |
| KR | 10-2018-0080604 A | 7/2018 | | |
| KR | 10-2018-0099434 A | 9/2018 | | |
| KR | 10-2019-0036173 A | 4/2019 | | |
| KR | 10-2020-0056651 A | 5/2020 | | |
| KR | 10-2020-0103350 A | 9/2020 | | |
| KR | 10-2251599 B1 | 5/2021 | | |
| KR | 10-2021-0073319 A | 6/2021 | | |
| KR | 10-2021-0076662 A | 6/2021 | | |

OTHER PUBLICATIONS

Extended European Search Report dated Aug. 28, 2024; European Appln. No. 22837791.7-1113 / 4316371 PCT/KR2022004403.
Korean Office Action with English translation dated Nov. 13, 2025; Korean Appln. No. 10-2021-0088037.

* cited by examiner

ELECTRONIC DEVICE AND METHOD OF MEASURING OXYGEN SATURATION BASED ON USER CONTEXT IN THE ELECTRONIC DEVICE

CROSS-REFERENCE TO RELATED APPLICATION(S)

This application is a continuation application, claiming priority under § 365(c), of an International application No. PCT/KR2022/004403, filed on Mar. 29, 2022, which is based on and claims the benefit of a Korean patent application number 10-2021-0088037, filed on Jul. 5, 2021, in the Korean Intellectual Property Office, the disclosure of which is incorporated by reference herein in its entirety.

TECHNICAL FIELD

The disclosure relates to an electronic device and measurement of oxygen saturation in the electronic device.

BACKGROUND ART

Various electronic devices have recently been developed to increase user convenience and miniaturized so that users may conveniently carry them. Along with the increase of interest in health, exercise has been attracting more attention as a means to maintain health.

Accordingly, electronic devices have been developed in various manners to measure and use bio-signals, and provide various services for managing a user's health or checking a health state by measuring the bio-signals. With the development of technology, the types of sensors mounted on electronic devices to measure bio-signals are diversifying, and various functions use the bio-signals.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an electronic device for measuring oxygen saturation in a user's blood by sensing the user's bio-signals. Oxygen saturation may be an index that indicates the oxygen-binding ability of hemoglobin included in the red blood cells of blood. Expressed as a percentage, an oxygen saturation is the ratio of the amount of oxygen bound to the hemoglobin to the oxygen-carrying capacity of the hemoglobin. The oxygen saturation value may be used for diagnosing health conditions such as respiratory and blood circulation. In daily life, the normal range of oxygen saturation may be about 90% to 100%. When an oxygen saturation is below about 90%, it may be considered lower than the normal range. Since the oxygen saturation may vary according to a user's various situations and environments (e.g., the user's condition), it may be difficult to diagnose the user's health condition using only the normal range of oxygen saturation in daily life. When various measurement periods and reference oxygen saturation ranges are set based on the user's various situations and environments, oxygen saturation suitable for the user's various situations and environments as well as the user's daily life may be used.

Another aspect of the disclosure is to provide method for a measurement period and a reference range of oxygen saturation are identified based on a user context including bio-information, environmental information, and medical information about a user, and an oxygen saturation is measured based on the identified measurement period and reference range of oxygen saturation, so that oxygen saturation may be used in various conditions of the user as well as in the daily life of the user.

Another aspect of the disclosure is to provide an apparatus for upon occurrence of a specified event (hospital entry (or visit) or a user input), an oxygen saturation-related disease history may be identified based on medical information about a user, a measurement period and a reference range of oxygen saturation may be identified based on the disease history of the user, and an oxygen saturation may be measured and notified based on the identified measurement period and reference range of oxygen saturation.

Another aspect of the disclosure is to provide an apparatus for upon occurrence of a specified event (hospital entry (or visit) or a user input), the result of an oxygen saturation-related medical treatment may be identified based on medical information about a user, a measurement period and a reference range of oxygen saturation may be identified based on the medical treatment result of the user, and an oxygen saturation may be monitored based on the identified measurement period and reference range of oxygen saturation and provided based on the result of the monitoring.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication module, a display, a memory, a biosensor configured to measure oxygen saturation, and at least one processor. The at least one processor may be configured to obtain electronic medical record (EMR) data from an external server through the communication module, identify oxygen saturation-related medical records based on the EMR data, based on occurrence of an event, determine a specified oxygen saturation measurement period and a specified reference oxygen saturation range based on the oxygen saturation-related medical records, measure oxygen saturation based on the specified oxygen saturation measurement period by using the biosensor, identify whether the measured oxygen saturation satisfies the specified reference oxygen saturation range, and display the measured oxygen saturation and information indicating whether the measured oxygen saturation satisfies the specified reference oxygen saturation range on the display.

In accordance with another aspect of the disclosure, a method of measuring oxygen saturation based on a user context in an electronic device is provided. The method includes obtaining EMR data from an external server through a communication module of the electronic device, identifying oxygen saturation-related medical records based on the EMR data, based on occurrence of an event, determining a specified oxygen saturation measurement period and a specified reference oxygen saturation range based on the oxygen saturation-related medical records, measuring oxygen saturation based on the specified oxygen saturation measurement period by using a biosensor of the electronic device, identifying whether the measured oxygen saturation satisfies the specified reference oxygen saturation range, and displaying the measured oxygen saturation and information indicating whether the measured oxygen saturation satisfies the specified reference oxygen saturation range on a display of the electronic device.

In accordance with another aspect of the disclosure, a non-volatile storage medium may store instructions which when executed by an electronic device, cause the electronic device to perform at least one operation. The at least one operation includes obtaining EMR data from an external server through a communication module of the electronic device, identifying oxygen saturation-related medical records based on the EMR data, based on occurrence of an event, determining a specified oxygen saturation measurement period and a specified reference oxygen saturation range based on the oxygen saturation-related medical records, measuring oxygen saturation based on the specified oxygen saturation measurement period by using a biosensor of the electronic device, identifying whether the measured oxygen saturation satisfies the specified reference oxygen saturation range, and displaying the measured oxygen saturation and information indicating whether the measured oxygen saturation satisfies the specified reference oxygen saturation range on a display of the electronic device.

Advantageous Effects

According to various embodiments, an electronic device may measure and use an oxygen saturation based on a user context including bio-information, environmental information, and medical information about a user, to enable use of oxygen saturation in various states of the user as well as in the daily life of the user.

According to various embodiments, upon occurrence of a specified event (hospital entry, hospital exit, a user input, or the end of a medical treatment), the result of an oxygen saturation-related medical treatment may be identified based on medical information about a user, an oxygen saturation may be monitored according to a measurement period and a reference range of oxygen saturation based on the medical treatment result of the user, and the monitoring result may be provided. Therefore, an oxygen saturation-related disease may be rapidly handled even after the medical treatment.

Other aspects, advantages, and salient features of the disclosure will become apparent to those skilled in the art from the following description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term user as used in various embodiments may refer to a person using an electronic device or a device (e.g., an artificial intelligence (AI) electronic device) using an electronic device.

Figure 1:
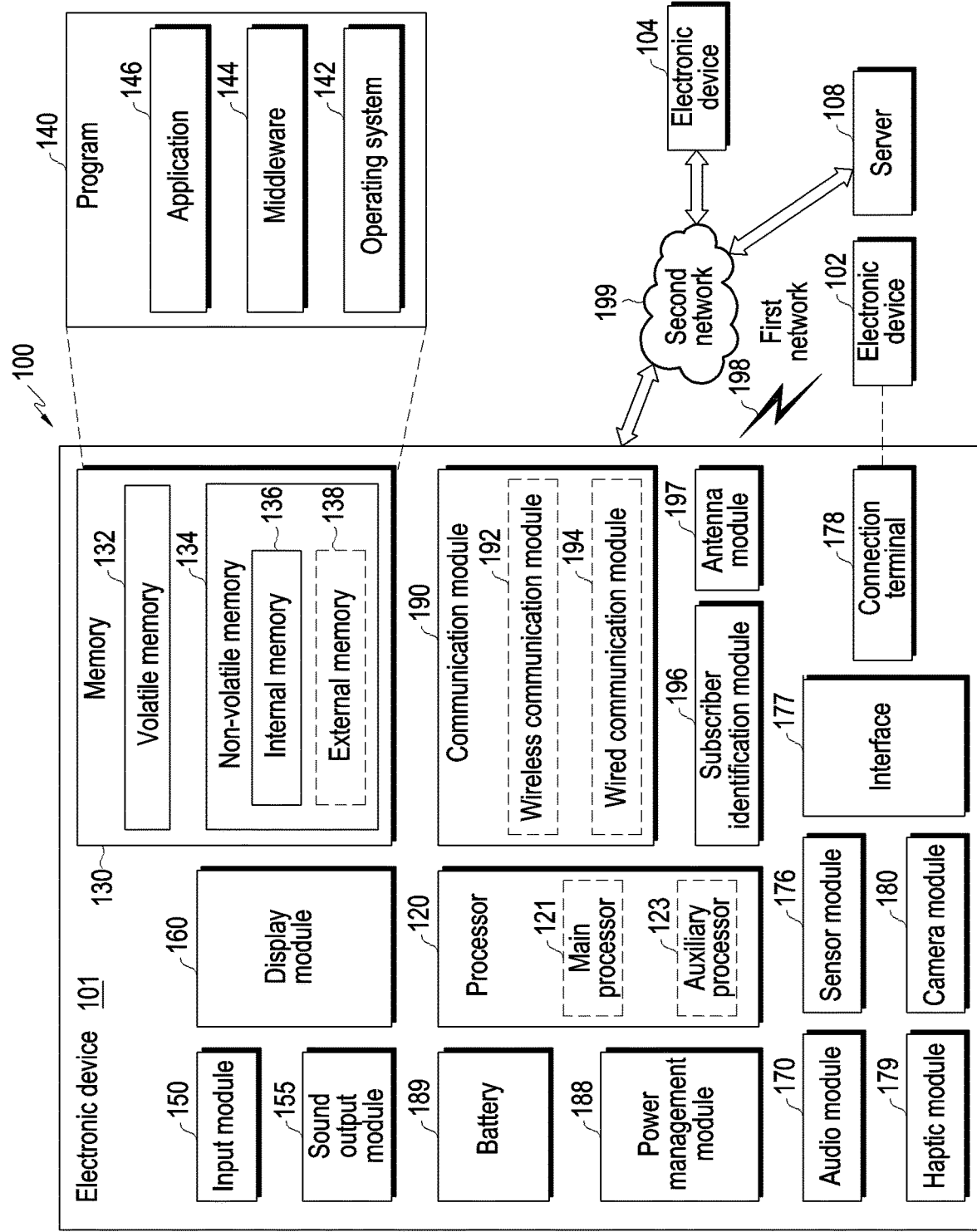
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
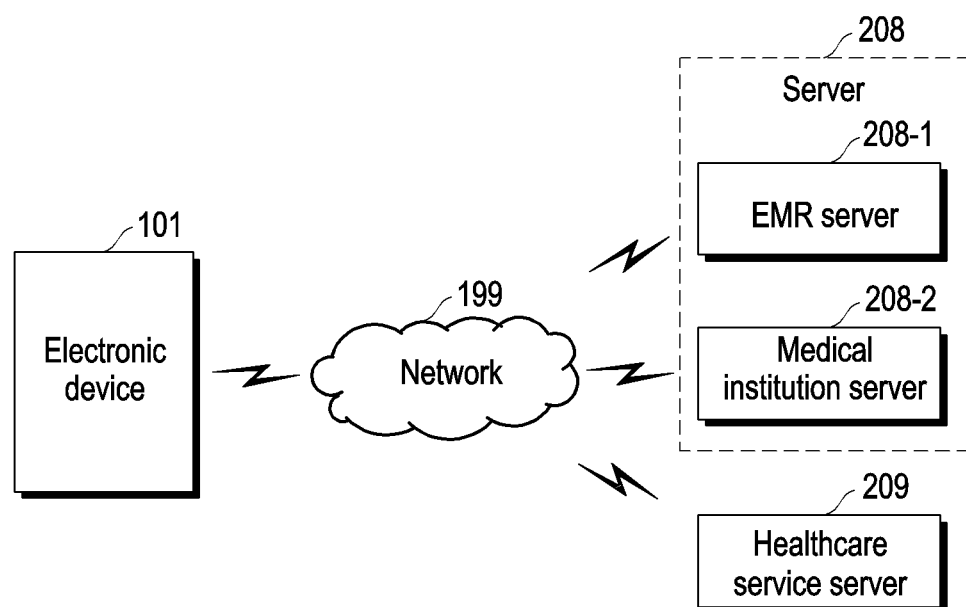
FIG. 2 is a diagram illustrating an electronic device and at least one medical-related server operating in conjunction with the electronic device according to an embodiment of the disclosure.

FIG. 2 is a diagram illustrating an electronic device and at least one medical-related server operating in conjunction with the electronic device according to an embodiment of the disclosure.

Referring to FIG. 2, the electronic device 101 according to an embodiment may receive or transmit medical information from or to at least one external medical-related server through the network 199 (e.g, the second network 199 of FIG. 1), and process the medical information. According to an embodiment, the medical information may include information related to medical activities such as an entire process of a medical treatment of a user, an activity according to a doctor's prescription after the medical treatment of the user, or a user activity for disease prevention and healthcare. According to an embodiment, the medical information may include electronic medical record (EMR) data. For example, the EMR data may include personal health record (PHR) data (e.g., fast healthcare interoperability resources (FHIR)-based data), healthcare data, or various types of health-related data or medical-related data. According to an embodiment, the at least one medical-related server may include an EMR server 208-1, a medical institution server 208-2, and/or a healthcare service server 209.

The EMR server 208-1 according to an embodiment may store (create, delete, or update) and manage EMR data of each registered user and provide the EMR data to an authenticated user after user authentication.

The medical institution server 208-2 according to an embodiment may be a server of an institution providing medical care and include a hospital server or a pharmacy server. For example, the medical institution server 208-2 may store EMR data related to a hospital medical record (e.g., a diagnosis result, a treatment process, and an aftercare method) of a user or EMR data corresponding to information about a medicine prescribed to the user or information about a medicine purchased by the user. For example, when a patient visits a hospital, a hospital server may register the patient and provide guidance of a treatment order or a medical treatment to the user, through a processor for managing the operation of the hospital. When each doctor enters a medical record, a medical history, prescription, and so on of a patient through a system connected to the hospital server, the hospital server may store the received information as EMR data. For example, the hospital server may provide the stored EMR data to the EMR server 208-1, for integrated management.

The healthcare service server 209 according to an embodiment may store health-related data corresponding to various activities performed by the user for disease prevention and healthcare, for example, an exercise activity, a treatment activity, or a health checkup activity. For example, the healthcare service server 209 may obtain information about various activities (e.g., an exercise activity) for healthcare of the user collected from the electronic device 101 of the user and process the information as health-related data, and may obtain EMR data from the EMR server 208-1 and/or the medical institution server 208-2 and process the EMR data as health-related data.

While it has been described above that the EMR server 208-1, the medical institution server 208-2, and the healthcare service server 209 are implemented as separate servers according to an embodiment, the EMR server 208-1 and the medical institution server 208-2 may be implemented as one server 208. Additionally, the EMR server 208-1, the medical institution server 208-2, and the healthcare service server 209 may be implemented as one server. According to an embodiment, each of the EMR server 208-1, the medical institution server 208-2, and the healthcare service server 209 may serve as the EMR server 208-1. According to an embodiment, the electronic device 101 may further operate in conjunction with servers of various institutions related to medical activities or health of the user, in addition to the EMR server 208-1, the medical institution server 208-2, and the healthcare service server 209.

According to an embodiment, the electronic device 101 may receive EMR data through communication with the EMR server 208-1, the medical institution server 208-2, and/or the healthcare service server 209 and process the received EMR data, or may provide autonomously collected information about various activities (e.g., an exercise activity) for healthcare of the user or EMR data, and provide the information or EMR data to the EMR server 208-1, the medical institution server 208-2, and/or the healthcare service server 209. For example, the electronic device 101 may include a biosensor capable of measuring bio-information about the user and/or an environmental sensor capable of sensing an environment (e.g., an ambient environment of the user or the electronic device 101), store and execute at least one application related to healthcare, and detect and provide a bio-signal by controlling the biosensor and/or the environmental sensor based on received EMR data, or provide (indicate or display) health-related information to the user by using the detected bio-signal and the EMR data.

Figure 3:
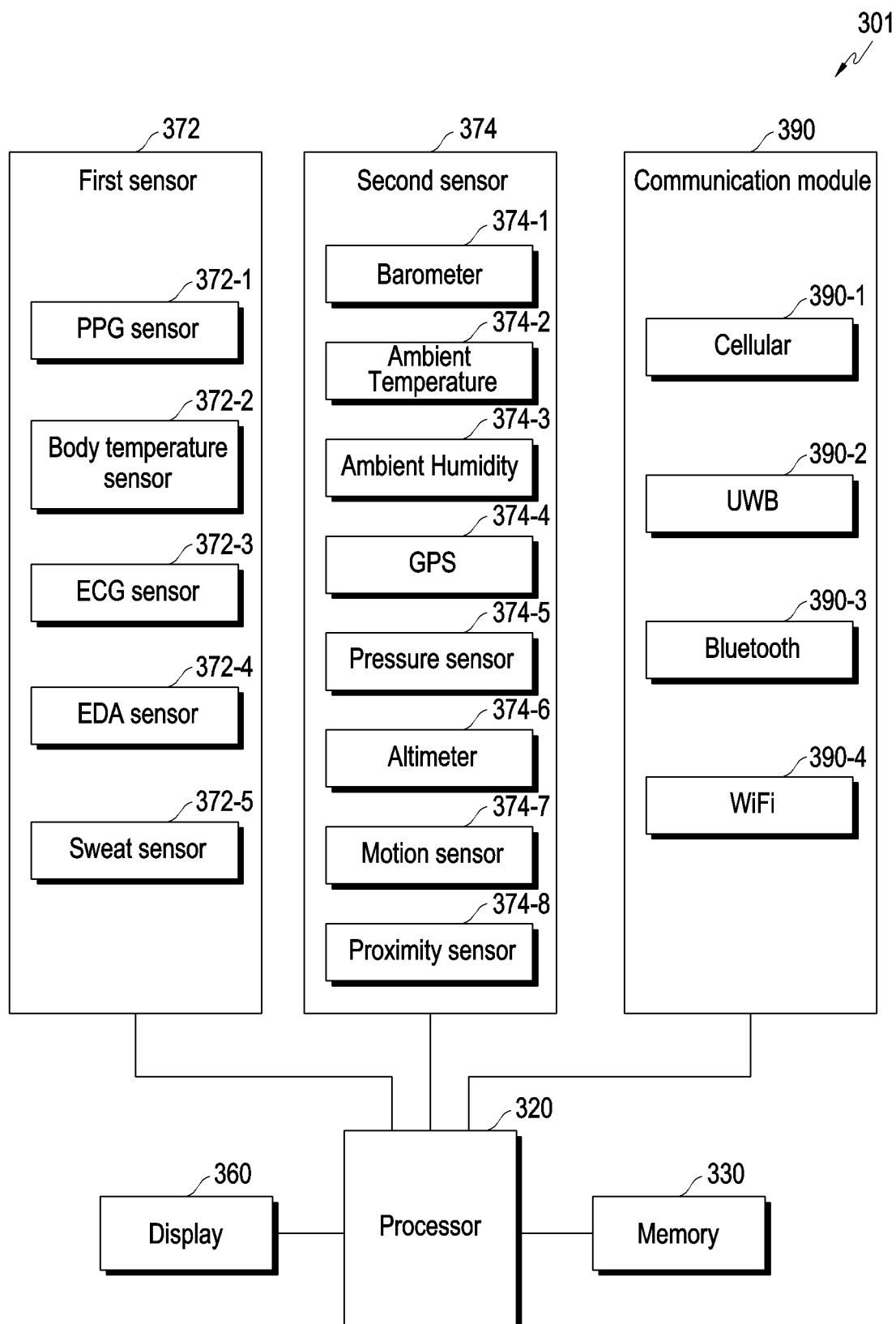
FIG. 3 is a block diagram illustrating an electronic device according to an embodiment of the disclosure.

FIG. 3 is a block diagram illustrating an electronic device according to an embodiment of the disclosure.

Referring to FIG. 3, an electronic device 301 (e.g., the electronic device 101 of FIG. 1 or FIG. 2) according to an embodiment may include at least one first sensor 372, at least one second sensor 374, at least one processor (also referred to as a processor) 320, a memory 330, a display 360, and/or a communication module 390. The electronic device 301 may further include various components or may not be provided with some of the components, not limited to the above-described components. The electronic device 301 according to an embodiment may further include the whole or part of the electronic device 101 illustrated in FIG. 1.

The at least one first sensor 372 according to an embodiment may include at least one biosensor. The biosensor may be a sensor capable of sensing a bio-signal of a user. For example, the first sensor 372 may include a photoplethysmography (PPG) sensor 372-1, and further include a body temperature sensor 372-2, an electrocardiogram (ECG) sensor 372-3, an electrodermal activity (EDA) sensor 372-4, and/or a sweat sensor 372-5. Other sensors related to biosensing may be further included.

The PPG sensor 372-1 according to an embodiment may include a pulse oximeter or an optical blood flow measurement sensor, and measure a heart rate (the number of heart beats) (or a pulse rate (the number of pulses)) and a blood oxygen saturation level by sensing based on reflected light of light incident on a blood stream. The body temperature sensor 372-2 according to an embodiment may measure a body temperature. The ECG sensor 372-3 according to an embodiment may measure an electrocardiogram by sensing an electrical signal from the heart through an electrode attached to the body. The EDA sensor 372-4 according to an embodiment may include, for example, a galvanic skin response (GSR) sensor and measure an excited state of the user by sensing an electrical activity of the skin. The sweat sensor 372-5 according to an embodiment may measure the degree of hydration and/or dehydration by sensing sweat of the user's body.

The at least one first sensor 372 according to an embodiment may provide the processor 320 with a bio-signal measured by sensing a bio-signal of the user under the control of the processor 320 or information (a value or numerical value) (e.g., a blood oxygen saturation level, a body temperature value, an electrocardiogram, an excited state value, a hydration and/or dehydration value) based on the bio-signal measured by sensing the bio-signal of the user.

The at least one second sensor 374 according to an embodiment may include at least one sensor for sensing an ambient environment of the electronic device 301 or the user holding the electronic device 301 or a motion of the electronic device 301 or the user holding the electronic device 301. For example, the at least one second sensor 374 may include a barometer 374-1, an ambient temperature sensor 374-2, an ambient humidity sensor 374-3, a global positioning system (GPS) module 374-4, a pressure sensor 374-5, an altimeter 374-6, a motion sensor 374-7, and/or a proximity sensor 374-8, and may further include at least one sensor for sensing an ambient environment of the electronic device 301 or the user holding the electronic device 301 or a motion of the electronic device 301 or the user holding the electronic device 301.

The barometer 374-1 according to an embodiment may sense an atmospheric pressure (barometric pressure) and measure (calculate or identify) an altitude by using the difference between atmospheric pressures. For example, the barometer 374-1 may include a piezo-resistive barometric pressure sensor. The piezo-resistive barometric pressure sensor may include a silicon (Si) semiconductor. In the piezo-resistive barometric pressure sensor, a resistance bridge may be formed by spreading impurities on the surface of a single Si crystal plate used as a diaphragm (hydraulic element) and an air pressure may be calculated by detecting, as a resistance variation, the deformation of the resistance bridge, when an atmospheric pressure is applied to the resistance bridge. For example, the barometer 374-1 may measure an altitude by using the difference between atmospheric pressures based on an atmospheric pressure change according to a height (altitude).

The ambient temperature sensor 374-2 according to an embodiment may sense an ambient temperature. The ambient humidity sensor 374-3 according to an embodiment may sense an ambient humidity. GNSS (global navigation satellite system) module 374-4 according to an embodiment may measure the location of the electronic device 101 or the user based on signals from satellites. For example, the GNSS may be the GPS, the global navigation satellite system (GLONASS), or the European satellite navigation system (GALILEO). The electronic device 101 may further include another system capable of satellite-based positioning, similar to the GNSS (e.g., a GPS aided geo augmented navigation (GAGAN) module).

The pressure sensor 374-5 according to an embodiment may sense a pressure applied to the electronic device 101. The altimeter 374-6 according to an embodiment may sense an altitude.

The motion sensor 374-7 according to an embodiment may sense a motion of the electronic device 301 or a motion of the user holding the electronic device 301. For example, the motion sensor 374-7 may include an acceleration sensor and/or a gyro sensor, and further include a geomagnetic sensor. The acceleration sensor may sense an acceleration or impact caused by movement of the electronic device 301 or the user holding the electronic device 301. The gyro sensor may sense a rotation direction or angle of the electronic device 301 according to movement of the electronic device 301 or the user holding the electronic device 301. The geomagnetic sensor may sense a geomagnetic direction. For example, the motion sensor 374-7 may identify whether the electronic device 301 or the user holding the electronic device 301 has moved by using the acceleration sensor and identify a motion of the user by using the gyro sensor during the movement. For example, the direction of the motion of the user may be further identified by using the geomagnetic sensor.

The proximity sensor 374-8 according to an embodiment may sense proximity of an object to the electronic device 301.

The at least one second sensor 374 according to an embodiment may provide the processor 320 with various pieces of sensing information (values or numerical values) (e.g., an atmospheric pressure value, a temperature value, a humidity value, a location, a pressure value, an altitude value, a rotation direction and rotation angle, motion sensing information, and/or a proximity) measured by sensing am ambient environment of the electronic device 301 or the user holding the electronic device 301 or a motion of the electronic device 301 or the user holding the electronic device 301 under the control of the processor 320.

The communication module 390 according to an embodiment may communicate with an external electronic device (e.g., the at least one external medical institution server 208-1, 208-2, and/or 209 of FIG. 2, or another external electronic device). According to an embodiment, the communication module 390 may receive EMR data through communication with the EMR server 208-1, the medical institution server 208-2, and/or the healthcare service server 209, or may autonomously collect information about activities or EMR data, for healthcare of the user and transmit the information or EMR data to the EMR server 208-1, the medical institution server 208-2, and/or the healthcare service server 209. For example, the communication module 390 may include a cellular communication module 390-1, an ultra wide band (UWB) communication module 390-2, a Bluetooth module 390-3, and/or a wireless fidelity (Wi-Fi) communication module 390-4, and may further include another module capable of communicating with an external electronic device.

The processor 320 according to an embodiment may be electrically coupled to the at least one first sensor 372, the at least one second sensor 374, the communication module 390, the memory 330, and/or the display 360.

The processor 320 according to an embodiment may obtain user context information including biosensing information obtained by the at least one first sensor 372, environment and/or motion sensing information obtained by the at least one second sensor 374, and/or EMR information obtained by the communication module 390. The processor 320 according to an embodiment may identify a user state (e.g., a current user state) based on the user context information (e.g., a current context) (e.g., every specified time or upon occurrence of an event). For example, the user state may be one of a plurality of user states. For example, the plurality of user states may include a daily life state, a state requiring an oxygen saturation check in relation to an oxygen saturation disease (e.g., upon entry into a hospital, upon receipt of a user input, or after discharge from a hospital (treatment completion)), a state in which oxygen saturation is equal to or less than a target value, hypoxia, rehabilitation in progress, exercising, and/or sleeping, and may further include various user states related to a medical treatment state, a health state, or an activity of the user. The processor 320 according to an embodiment may identify (e.g., select, determine, or change) an oxygen saturation measurement period and a normal reference oxygen saturation range based on the user state. For example, the processor 320 may identify (e.g., select, determine, or change) the oxygen saturation measurement period and the normal reference oxygen saturation range corresponding to the identified state from information about an oxygen saturation measurement period and a normal reference oxygen saturation range for each user state, stored in the memory 330.

Table 1 below may list various measurement periods and oxygen saturation references.

TABLE 1

| Measurement period | | Oxygen saturation references | |
|---|---|---|---|
| First measurement period | About 10 minutes | First reference range | About 95% or higher |
| Second measurement period | About 1 minute | Second reference range | About 93 to 95% or higher (for adults) or about 94 to 98% higher (for children) |
| Third measurement period | About 1 second | Third reference range | About 90% or higher |

Referring to Table 1, when the user state is the daily life state, the processor 320 according to an embodiment may identify (e.g., select, determine, or change) the first measurement period and the first reference range as the oxygen saturation measurement period and the normal reference oxygen saturation range, measure oxygen saturation every 10 minutes, and identify whether the measured oxygen saturation is about 95% or higher. When the user state is the state requiring an oxygen saturation check in relation to an oxygen saturation disease, the processor 320 according to an embodiment may identify (e.g., select, determine, or change) the second measurement period and the second reference range as the oxygen saturation measurement period and the reference oxygen saturation range, measure oxygen saturation every minute, and identify whether the measured oxygen saturation is about 93 to 95% or higher. In the state where oxygen saturation is equal to or less than a target value or in the case of hypoxia, the processor 320 according to an embodiment may identify (e.g., select, determine, or change) the third measurement period and the third reference range as the oxygen saturation measurement period and the reference oxygen saturation range, measure oxygen saturation every second, and identify whether the measured oxygen saturation is about 90% or higher. It may be apparent to those skilled in the art that the measurement periods and reference ranges in Table 1 are merely an example, and thus other values may be applied, and that other oxygen saturation measurement periods and other reference oxygen saturation ranges may be applied based on various user states. The processor 320 according to an embodiment may measure oxygen saturation according to an oxygen saturation measurement period based on an identified (selected, determined, or changed) user state, compare a result of the oxygen saturation measurement with the reference oxygen saturation range, and indicate or feed back health information related to the oxygen saturation according to the current state to the user. For example, the processor 320 may display current oxygen saturation according to the current state and whether the current oxygen saturation is within a normal range on the display 360, or may output a sound indicating the current oxygen saturation according to the current state and whether the current oxygen saturation is within the normal range through a speaker (not shown). For example, the processor 320 may transmit the current oxygen saturation according to the current state, and when the current oxygen saturation is not within the normal range, a signal (or message) requesting a medical treatment (or preferential treatment) to an external medical institution server (e.g., the medical institution server 208-2 of FIG. 2).

The processor 320 according to an embodiment may obtain EMR data of the user based on occurrence of a specified event (e.g., a user input, hospital entry (or visit), or hospital exit (or discharge)) and check medical records of the user based on the obtained EMR data. Alternatively, the processor 320 according to an embodiment may check the medical records of the user based on received EMR data, based on the occurrence of the specified event. For example, the processor 320 may identify whether the user state is the state requiring an oxygen saturation check by identifying whether the medical records include information about a disease or treatment related to oxygen saturation. For example, the disease related to oxygen saturation may include a respiratory disease or lung disease, and the treatment related to oxygen saturation may be a treatment of the respiratory disease or lung disease. For example, the processor 320 may obtain EMR data of the user from the at least one external medical institution server 208-1, 208-2, and/or 209, or another external electronic device. For example, the processor 320 may identify whether the obtained EMR data of the user includes data (e.g., FAIR data) which includes a word or a disease code (e.g., 359615001) related to the information about a disease or treatment related to oxygen saturation. In another example, the processor 320 may identify whether there is information about a respiratory disease related to oxygen saturation of the user or information about a treatment of the respiratory disease based on hospital medical records (e.g., a diagnosis result, a treatment process, and an aftercare method) included in the obtained EMR data of the user or information about a medicine prescribed to the user or purchased by the user included in the EMR data. The processor 320 according to an embodiment may identify (e.g., select, determine, or change) a measurement period and a reference oxygen saturation range based on the presence of the information about the disease related to oxygen saturation or the information about the treatment as a corresponding period and reference range. For example, the processor 320 may change to another measurement period (a shorter period than in the daily life state) and another reference range (lower than in the daily life state) (e.g., the second measurement period and the second reference range) corresponding to a state (e.g., the state requiring an oxygen saturation check in relation to an oxygen saturation disease) other than the daily life state among a plurality of oxygen saturation measurement periods and a plurality of reference oxygen saturation ranges. The processor 320 according to an embodiment may measure oxygen saturation based on the second measurement period, identify whether the oxygen saturation measured according to the second measurement period satisfies the second reference range, and output the measured oxygen saturation and information indicating whether the normal range is satisfied according to the measured oxygen saturation and the second reference range or transmit the measured oxygen saturation and the information indicating whether the normal range is satisfied according to the measured oxygen saturation and the second reference range to the outside. For example, the processor 320 may transmit, to an external medical institution server (e.g., the medical institution server 208-2 of FIG. 2), current oxygen saturation according to a current state, and when the current oxygen saturation is not within the normal range, a signal (or message) requesting a medical treatment (or preferential treatment).

The processor 320 according to an embodiment, which is a hardware module or a software module (e.g., an application program), may be a hardware component (function) or software element (program) including at least one of various sensors of the electronic device 301, an I/O interface, a module that manages the state or environment of the electronic device 301, or a communication module. According to an embodiment, the processor 320 may include, for example, one or a combination of two or more of hardware, software, and firmware. The processor 320 may not be provided with at least some of the above components or may further include other components for performing an image processing operation in addition to the above components.

The memory 330 according to an embodiment may store an application. For example, the memory 330 may store an application (function or program) related to oxygen saturation measurement, an exercise application, or a healthcare application. According to an embodiment, the memory 330 may store oxygen saturation measurement result information, and store a plurality of measurement periods and a plurality of reference ranges (e.g., Table 1) according to a plurality of user states. The memory 330 according to an embodiment may store a program (e.g., the program 140 of FIG. 1) used for a functional operation, and various data generated during execution of the program 140. The memory 330 may largely include an area (not shown) for storing the program 140 and an area (not shown) for storing data. The area storing the program 140 may store program information related to driving of the electronic device 301, such as an operating system (OS) for booting the electronic device 301 (e.g., the OS 142 of FIG. 1). The data area (not shown) may store transmitted and/or received data and generated data according to various embodiments. In addition, the memory 330 may include at least one of a flash memory, a hard disk, a multimedia card micro-type memory (e.g., secure digital (SD) or extreme digital (XD) memory), a random access memory (RAM), or a read only memory (ROM).

The display 360 according to an embodiment may display various types of information under the control of the processor 320. For example, the display 360 may display an oxygen saturation level, information indicating that the oxygen saturation level is normal, or information indicating that the oxygen saturation level is not normal under the control of the processor 320. Alternatively, the display 360 may display information generated during an operation of requesting a medical treatment from an external medical institution server (e.g., 208-2) and an operation of accepting the medical treatment request under the control of the processor 320. According to an embodiment, the display 360 may be implemented as a touch screen. When the display 360 is implemented together with an input module in the form of a touch screen, the display 360 may display various pieces of information generated according to a user touch operation. According to an embodiment, the display 360 may include at least one of a liquid crystal display (LCD), a thin film transistor LCD (TFT-LCD), an organic light emitting diode (OLED) display, a light emitting diode (LED) display, an active matrix organic LED (AMOLED) display, a micro LED display, a mini LED display, a flexible display, or a three-dimensional display. In addition, some of these displays may be configured as a transparent type or a light transmitting type so that the outside may be viewed through the display. This display may be configured in the form of a transparent display including a transparent OLED (TOLED). According to another embodiment, the electronic device 301 may further include another mounted display module (e.g., an extended display or a flexible display) in addition to the display 360.

According to an embodiment, the electronic device 301 may further include various components, not limited to the configuration illustrated in FIG. 3.

According to an embodiment, the electronic device 301 may further include an audio module (not shown) (e.g., the audio module 170 of FIG. 1) or a vibration module (not shown) (e.g., the haptic module 179 of FIG. 1). The audio module may output a sound, and, for example, may be configured to include at least one of an audio codec, a microphone (MIC), a receiver, an earphone output (EAR L), or a speaker. The audio module may output information related to a physical condition of the user, information related to an abnormal symptom of a health condition of the user, or additional information by an audio signal based on the measured oxygen saturation information. For example, the vibration module may output the information related to the physical condition of the user, the information related to the abnormal symptom of the health condition of the user, or the additional information by vibrations based on the obtained measured oxygen saturation information.

In the foregoing embodiment, the main components of the electronic device have been described by taking the electronic device 301 of FIG. 3. However, in various embodiments, all of the components illustrated in FIG. 3 are not compulsory, and the electronic device 301 may be implemented with more components than the illustrated components, or fewer components than the illustrated components. Further, the positions of the main components of the electronic device 301 described above with reference to FIG. 3 may be changed according to various embodiments.

According to various embodiments, an electronic device (e.g., the electronic device 101 of FIG. 1 or the electronic device 301 of FIG. 3) may include a communication module (e.g., the communication module 190 of FIG. 1 or the communication module 390 of FIG. 3), a display (e.g., the display module 160 of FIG. 1 or the display 360 of FIG. 3), a memory (e.g., the memory 130 of FIG. 1 or the memory 330 of FIG. 3), a biosensor (e.g., the sensor module 176 of FIG. 1 or the first sensor 372 of FIG. 3) configured to measure oxygen saturation, and at least one processor (e.g., the processor 120 of FIG. 1 or the processor 320 of FIG. 3). The at least one processor may be configured to obtain EMR data from an external server through the communication module, identify oxygen saturation-related medical records based on the EMR data, based on occurrence of an event, determine a specified oxygen saturation measurement period and a specified reference oxygen saturation range based on the medical records, measure oxygen saturation based on the specified oxygen saturation measurement period by using the biosensor, identify whether the measured oxygen saturation satisfies the specified reference oxygen saturation range, and display the measured oxygen saturation and information indicating whether the measured oxygen saturation satisfies the specified reference oxygen saturation range on the display.

According to various embodiments, the at least one processor may be configured to determine the specified oxygen saturation measurement period and the specified reference oxygen saturation range further based on an altitude value measured by a barometer.

According to various embodiments, the event may be a hospital entry event, and the at least one processor may be configured to transmit a preferential treatment request message to an external medical institution server, when the measured oxygen saturation does not satisfy the specified reference oxygen saturation range.

According to various embodiments, the at least one processor may be configured to receive a response to the preferential treatment request message from the external medical institution server, and display information indicating that the preferential treatment request is accepted or a preferential treatment is unavailable based on the response on the display.

According to various embodiments, the at least one processor may be configured to transmit the measured oxygen saturation to the external medical institution server based on the acceptance of the preferential treatment request.

According to various embodiments, the event may be a hospital exit event, and the at least one processor may be configured to transmit a re-treatment request message to the external medical institution server, when the measured oxygen saturation does not satisfy the specified reference oxygen saturation range.

According to various embodiments, the at least one processor may be further configured to transmit the measured oxygen saturation to the external medical institution server, when the measured oxygen saturation does not satisfy the specified reference oxygen saturation range.

According to various embodiments, the at least one processor may be configured to identify a user history of an oxygen saturation-related disease and/or a user history of severity of the oxygen saturation-related disease in the medical records.

According to various embodiments, the oxygen saturation-related disease may include a respiratory disease or a lung disease.

Figure 4:
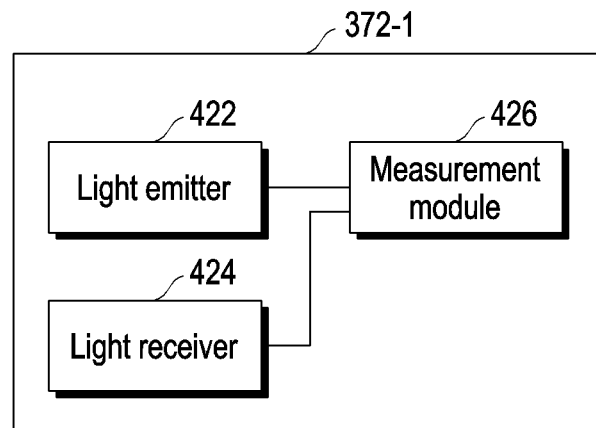
FIG. 4 is a diagram illustrating a configuration of a photoplethysmography (PPG) sensor for measuring oxygen saturation according to an embodiment of the disclosure.

FIG. 4 is a diagram illustrating a configuration of a PPG sensor for measuring an oxygen saturation level according to an embodiment of the disclosure.

Referring to FIG. 4, the PPG sensor 372-1 according to an embodiment may include a pulse oximeter, an optical sensor, and a laser diode (LD), and/or an image sensor, and further include various types of sensors that output light to the outside or receive light from the outside. The PPG sensor 372-1 according to an embodiment may include a light emitter 422, a light receiver 424, and a measurement module 426.

The light emitter 422 according to an embodiment may include at least one of a spectrometer, a vertical cavity surface emitting laser (VCSEL), an LED, a white LED, or a white laser.

The light receiver 424 according to an embodiment may include an avalanche photodiode (PD), a single-photon avalanche diode (SPAD), a photodiode, a photomultiplier tube (PMT), a charge-coupled device (CCD), a complementary metal oxide semiconductor (CMOS) array, or a spectrometer. For example, the light receiver 424 may be a reflective type or a transmissive type in structure.

The light emitter 422 according to an embodiment may output light to the outside. For example, the light emitter 422 may output at least one of an IR ray, red light, green light, or blue light, and include a light emitting element (e.g., LED) corresponding to each of at least one type of output light. According to an embodiment, light emitted to the outside from the light emitter 422 may be irradiated to a wearer's body, and at least a part of the irradiated light may be reflected from the wearer's body (e.g., the skin, skin tissues, a fat layer, a vein, an artery, or capillaries). According to an embodiment, the light receiver 424 may receive the light reflected from the user's body and output an electrical signal (hereinafter, referred to as a bio-signal) corresponding to the received light.

The measurement module 426 (a processing unit or integrated circuit (IC)) according to an embodiment may be electrically coupled to the light emitter 422, the light receiver 424, and the processor 320. The measurement module 426 according to an embodiment may measure a blood oxygen saturation (SpO2) by analyzing an electrical signal corresponding to light received by the light receiver 424. According to an embodiment, the measurement module 426 may be implemented as an oxygen saturation measurement algorithm, and an operation based on the oxygen saturation measurement algorithm may be performed by the processor 320.

According to an embodiment, the components of the PPG sensor 372-1 are not limited to the light emitter 422, the light receiver 424, and/or the measurement module 426. For example, the PPG sensor 372-1 may further include a signal processor (not shown) (e.g., an analog front end). The signal processor (not shown) may include an amplifier for amplifying a bio-signal and an analog-to-digital converter (ADC) for converting an analog bio-signal into a digital bio-signal. However, the components included in the signal processor may not be limited to the above-described amplifier and ADC. According to various embodiments, the number of light emitters 422 and/or light receivers 424 included in the electronic device 301 may be plural, and the light emitters 422 and/or the light receivers 424 may form at least one array. According to various embodiments, different weights may be applied to the light emitters 422 and/or the light receivers 424 (or bio-signals obtained from the plurality of light emitters 422 and/or the plurality of light receivers 424). According to various embodiments, the PPG sensor 372-1 may be disposed on a housing of the electronic device 301 or may be disposed to be exposed to the outside through the housing. The arrangement position or direction of the PPG sensor 372-1 will be described in more detail with reference to the drawings to be described later.

Figures 5A, 5B:
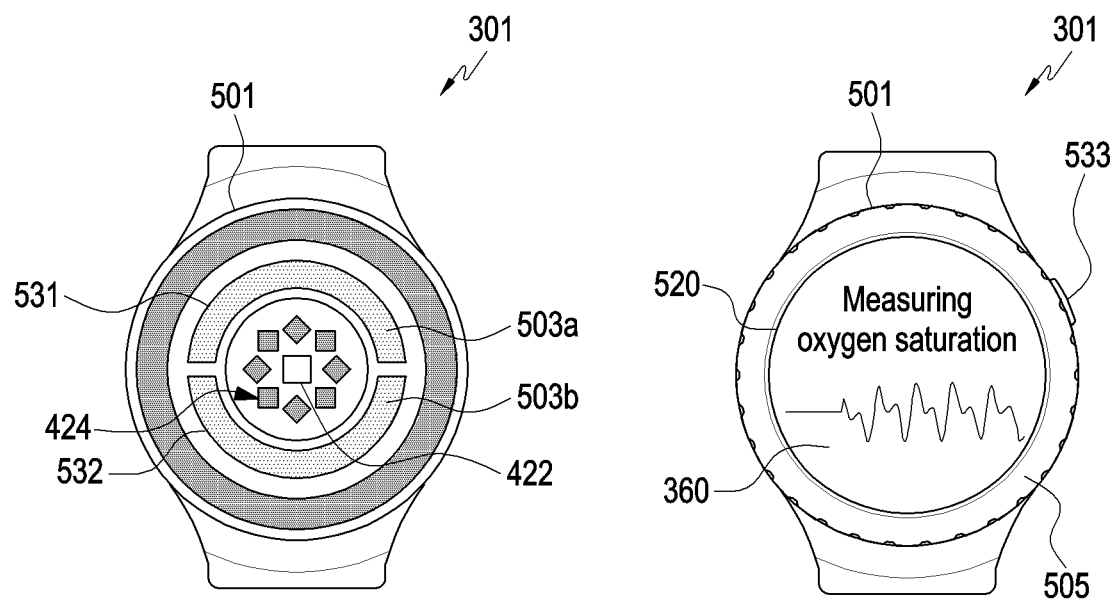
FIGS. 5A and 5B are diagrams illustrating an electronic device implemented as a wearable electronic device according to various embodiments of the disclosure.

FIGS. 5A and 5B are diagrams illustrating examples of an electronic device implemented as a wearable electronic device according to various embodiments of the disclosure.

Referring to FIGS. 5A and 5B, the electronic device 301 according to an embodiment may be a wearable device in the form of a wrist watch that may be worn on a user's wrist or a wearable device that may be worn on any other part of the body (e.g., the head, a forearm, a thigh, or another part of the body from which heartbeats may be measured). The electronic device 301 according to an embodiment may include a housing 501 including a first surface 510 (e.g., a rear surface), a second surface 520 (e.g., a front surface), and a third surface (e.g., a side surface) surrounding a space between the first surface 510 (e.g., the rear surface) and the second surface 520 (e.g., the front surface).

Referring to FIG. 5A, the light emitter 422 and the light receiver 424, which are at least a part of the PPG sensor 372-1, may be disposed on the first surface 510 (e.g., the rear surface), which is one surface of the housing 501. When the electronic device 301 is worn, the light emitter 422 and the light receiver 424 may be disposed on the first surface 510 (e.g., the rear surface) of the electronic device 301 to contact a part (e.g., a wrist) of the user's body. A first electrode 531 and a second electrode 532, which are at least a part of the ECG sensor 372-3 may be disposed on at least two parts of a first member 503a and 503b disposed to surround the light emitter 422 and the light receiver 424.

Referring to FIG. 5B, the display 360 may be disposed on the second surface 520 (e.g., the front surface) that is the other surface of the housing 501 in the electronic device 301 according to an embodiment. A third electrode 533, which is at least another part of the ECG sensor 372-3, may be disposed on at least one part of a second member 505 formed to surround the display 360 according to an embodiment. According to various embodiments, the third electrode 533 may be disposed on at least one part of the housing 501 so as not to come into contact with a part of the user's body when the electronic device 301 is worn. According to an embodiment, the third electrode 533 may be disposed on the second surface 520 (e.g., the front surface) of the electronic device 301. For example, the third electrode 533 may be disposed on or included in the display 360, in the form of a transparent electrode (e.g., indium tin oxide: ITO).

According to an embodiment, when with the electronic device 301 brought into contact with a part (a wrist) of the user's body, the light receiver 424 senses light which has been irradiated to the body from the light emitter 422 and reflected from the body, the PPG sensor 372-1 (or the processor 320) may measure an oxygen saturation level. According to an embodiment, as an electrical signal of the body is sensed based on contact between the third electrode 533 and a second part (a finger of the other hand or a connection point of a finger of the other hand) while the first electrode 531 and the second electrode 532 contact a first part (e.g., a wrist area) of the body or connection points (not shown) (e.g., a first connection point and a second connection point) of the first part, the ECG sensor 372-3 (or the processor 320) may measure an electrocardiogram.

Figure 6:
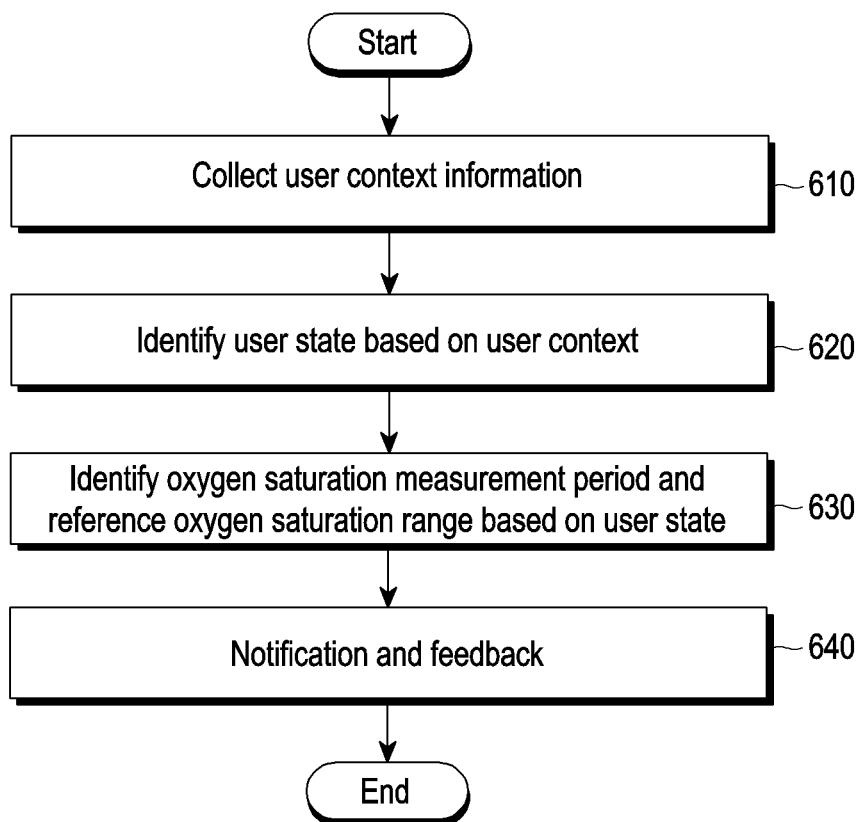
FIG. 6 is a flowchart illustrating an operation of measuring oxygen saturation based on user context information in an electronic device according to an embodiment of the disclosure.

FIG. 6 is a flowchart illustrating an operation of measuring an oxygen saturation level based on user context information in an electronic device according to an embodiment of the disclosure.

Referring to FIG. 6, a processor (e.g., the processor 120 of FIG. 1 or the processor 320 of FIG. 3) of an electronic device (e.g., the electronic device 101 of FIG. 1 or the electronic device 301 of FIG. 3) according to an embodiment may perform at least one of operations 610 to 640.

In operation 610, the processor 320 according to an embodiment may collect (or obtain) user context information. For example, the processor 320 may obtain user context information including biosensing information obtained by the at least one first sensor 372, environment and/or motion sensing information obtained by the at least one second sensor 374, and/or EMR information obtained by the communication module 390.

In operation 620, the processor 320 according to an embodiment may identify a user state (e.g., a current user state) based on the user context information (e.g., a current context) (e.g., every specified time or upon occurrence of an event). For example, the user state may be one of a plurality of user states. For example, the plurality of user states may include a daily life state, an event occurrence state (e.g., hospital entry (visit), a user input, or hospital exit (or hospital leaving or treatment completion), a state of an oxygen saturation level equal to or lower than a target value, a hypoxia state, a rehabilitation state, an exercise state, a high altitude state based on altitude information around a user (a state in which a measured altitude value around the user is higher than a specified altitude value), and/or a sleep state. The user states may further include various other user states related to a medical treatment state, a health state, or an activity of the user.

In operation 630, the processor 320 according to an embodiment may identify (e.g., select, determine, or change) an oxygen saturation measurement period and a reference oxygen saturation range based on the user state. For example, the processor 320 may identify (e.g., select, determine, or change) an oxygen saturation measurement period and a reference oxygen saturation range corresponding to the identified user state among oxygen saturation measurement periods and reference oxygen saturation ranges for the respective user states (or a plurality of oxygen saturation measurement periods and a plurality of reference oxygen saturation ranges), stored in the memory 330. For example, when the user state is the daily life state, the processor 320 may identify (e.g., select, determine, or change) the oxygen saturation measurement period and a reference oxygen saturation range to be the first measurement period and the first reference range, measure oxygen saturation every 10 minutes, and identify whether the measured oxygen saturation is about 95% or higher. According to an embodiment, when the user state is the event occurrence state, the processor 320 may identify (e.g., select, determine, or change) the oxygen saturation measurement period and the reference oxygen saturation range to be the second measurement period and the second reference range, measure an oxygen saturation level every minute, and identify whether the measured oxygen saturation is about 93 to 95% or higher. According to an embodiment, when the user state is the state of oxygen saturation equal to or less than a target value or the hypoxia state, the processor 320 may identify (e.g., select, determine, or change) the oxygen saturation measurement period and a reference oxygen saturation range to be the third measurement period and the third reference range, measure oxygen saturation every second, and identify whether the measured oxygen saturation is about 90% or higher. According to an embodiment, when the user state is the high altitude state based on information about an altitude around a user (the state in which an altitude value measured around the user is higher than a specified altitude value), the processor 320 may identify (e.g., select, determine, or change) the oxygen saturation measurement period and the reference oxygen saturation range to be the third measurement period and the third reference range, measure oxygen saturation every second, and identify whether the measured oxygen saturation level is about 90% or higher.

It may be apparent to those skilled in the art that the measurement periods and the reference ranges are merely an example and other values may also be applied, and that different oxygen saturation measurement periods and different reference oxygen saturation ranges may be applied based on various user states. For example, because a respiratory patient may have oxygen saturation much lower than that of a healthy person in an exercise state, the processor 320 may change the oxygen saturation measurement period to a shorter measurement period in the exercise state than in the daily life state, and the reference oxygen saturation range to a lower reference range in the exercise state than in the daily life state, for the respiratory patient, and perform intensive monitoring. In addition, in the state where a measured altitude value is higher than a specified altitude value (the high altitude state), oxygen saturation may significantly affect the respiration of the respiratory patient. Accordingly, the processor 320 may change the oxygen saturation measurement period to a shorter measurement period in the high altitude state than in a low altitude state (a state where a measured altitude value is not higher than the specified altitude value), and the reference oxygen saturation range to a lower reference range in the high altitude state than in the daily life state, and may perform intensive monitoring.

Further, the respiratory patient may also have oxygen saturation much lower than that of the healthy person in the sleep state. Therefore, the processor 320 may change the oxygen saturation measurement period to a shorter measurement period in the sleep state than in the daily life state and the reference oxygen saturation range to a lower reference range in the sleep state than in the daily life state, for the respiratory patient, and perform intensive monitoring. In addition, a sharp decrease in oxygen saturation during sleep may be a situation that requires a treatment for a respiratory disease. When the oxygen saturation is less than or equal to specified oxygen saturation during sleep, the processor 320 according to an embodiment may transmit oxygen saturation information (or a request for a treatment) to an external server (e.g., a hospital) and output guidance information recommending a hospital visit through the display 360 or the speaker visually or audibly.

In operation 640, the processor 320 according to an embodiment may provide a notification or a feedback according to the oxygen saturation measurement result based on the identified (or selected, determined, or changed) oxygen saturation measurement period and reference range. For example, the processor 320 may measure oxygen saturation according to the oxygen saturation measurement period based on the identified (selected, determined, or changed) user state, compare the oxygen saturation measurement result with the reference oxygen saturation range, and provide or feed back health information related to the oxygen saturation according to the current state to the user. For example, the processor 320 may display the current oxygen saturation according to the current state and indicate whether the current oxygen saturation falls within a normal range (or hypoxia range) through the display 360 or may output a sound indicating the current oxygen saturation according to the current state and whether the current oxygen saturation is in the normal range (or the hypoxia range) through the speaker. For example, when the current oxygen saturation according to the current state is not within the normal range (or is within the hypoxia range), the processor 320 may transmit the current oxygen saturation and a signal (or message) requesting a treatment (or preferential treatment) to an external medical institution server (e.g., the medical institution server 208-2 of FIG. 2).

Figure 7:
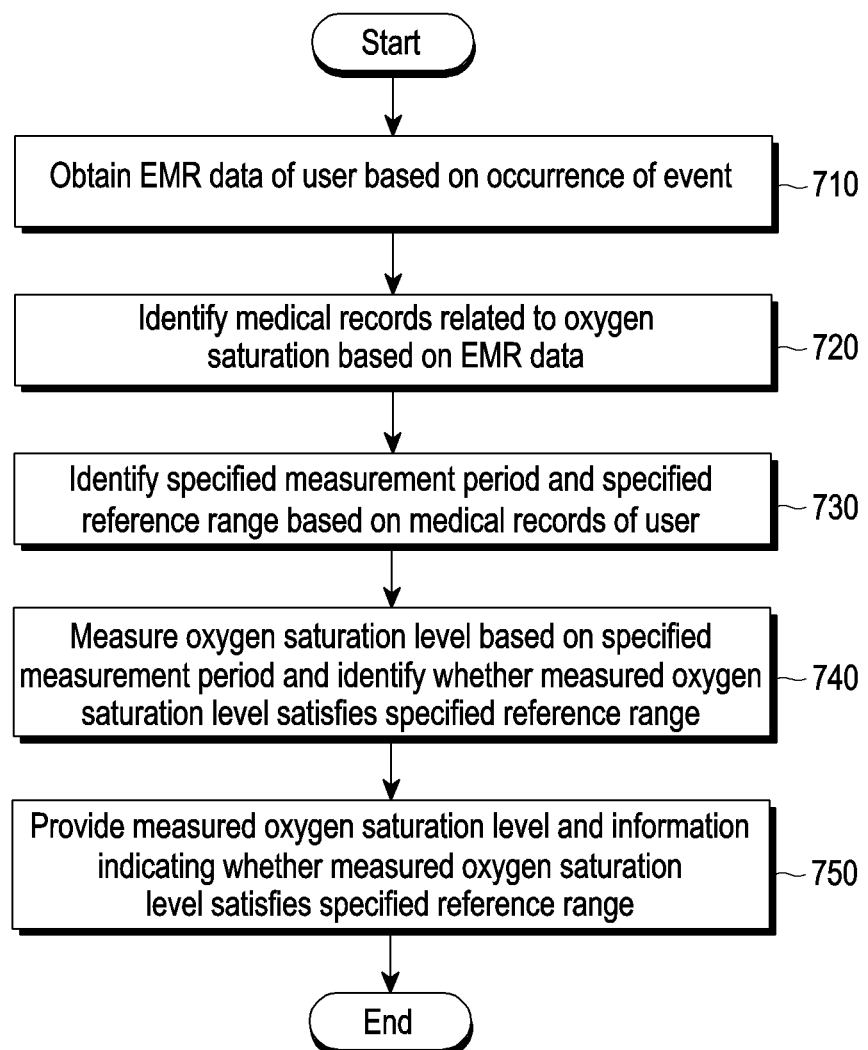
FIG. 7 is a flowchart illustrating an operation of measuring oxygen saturation based on electronic medical record (EMR) data obtained upon occurrence of an event in an electronic device according to an embodiment of the disclosure.

FIG. 7 is a flowchart illustrating an operation of measuring oxygen saturation based on EMR data obtained upon occurrence of an event in an electronic device according to an embodiment of the disclosure.

Referring to FIG. 7, a processor (e.g., the processor 120 of FIG. 1 or the processor 320 of FIG. 3) of an electronic device (e.g., the electronic device 101 of FIG. 1 or the electronic device 301 of FIG. 3) according to an embodiment may perform at least one of operations 710 to 750.

In operation 710, the processor 320 according to an embodiment may obtain EMR data. For example, the processor 320 may obtain the EMR data based on occurrence of an event. For example, the event may include hospital entry (or visit), a user input, or hospital exit (or hospital discharge or completion of a treatment). The processor 320 according to an embodiment may obtain EMR data of a user from at least one of medical-related servers (e.g., the EMR server 208-1, the medical institution server 208-2, and/or the healthcare service server 290). For example, the processor 320 may identify occurrence of a user input event based on reception of a user touch input or a user voice input. For example, the processor 320 may identify whether the user has entered or left a hospital by using the GPS module 374-4? or the communication module 390 (e.g., the UWB module 390-2 and/or the Bluetooth module 390-3). When identifying hospital entry or exit, the processor 320 may identify occurrence of a hospital visit event or a hospital discharge event. For example, the processor 320 may identify occurrence of a treatment completion event based on reception of a treatment completion message from the medical institution server 208-2 by using the GPS module 374-4 or the communication module 390 (e.g., the UWB module 390-2 and/or the Bluetooth module 390-3).

In operation 720, the processor 320 according to an embodiment may identify medical records of the user based on the obtained EMR data. For example, the processor 320 may identify whether there is disease information or treatment information related to oxygen saturation in the medical records. For example, the processor 320 may identify the medical records based on the EMR data obtained based on the occurrence of the event, or may obtain the EMR data before the event occurs and when the event occurs, identify the medical records based on the pre-obtained EMR data.

For example, the processor 320 may identify, based on the EMR data, whether the user has a history of an oxygen saturation-related disease (e.g., a respiratory disease or a lung disease) and/or a severity history of the oxygen saturation-related disease. For example, when there is a word related to information about an oxygen saturation-related disease or information about an oxygen saturation-related treatment and/or an oxygen saturation-related disease code (e.g., 359615001) in the medical records of the obtained EMR data of the user, the processor 320 may identify that the user has a history of an oxygen saturation-related disease, and identify a severity history of the oxygen saturation-related disease. In another example, the processor 320 may identify whether the user has a history of an oxygen saturation-related disease, and/or identify a severity history of the oxygen saturation-related disease, based on the medical records (e.g., a diagnosis result, a treatment process, and an aftercare method) included in the obtained EMR data of the user, information about a medicine prescribed to the user, or information about a medicine purchased by the user.

In operation 730, the processor 320 according to an embodiment may identify (e.g., select, determine, or change) a specified measurement period and a specified reference range as an oxygen saturation measurement period and a reference oxygen saturation, based on the medical records related to oxygen saturation. For example, the processor 320 may identify (e.g., select, determine, or change) another measurement period (a shorter period than in the daily life state) and another reference range (a lower reference range than in the daily life state) (e.g., the second (or third) measurement period and the second (or third) reference range) corresponding to a state (e.g., the existence of a history of an oxygen saturation-related disease and a severity history of the oxygen saturation-related disease) other than the daily life state among a plurality of oxygen saturation measurement periods and a plurality of reference oxygen saturation ranges.

In operation 740, the processor 320 according to an embodiment may measure oxygen saturation based on the specified measurement period and identify whether the measured oxygen saturation satisfies the specified reference range.

In operation 750, the processor 320 according to an embodiment may display the oxygen saturation measured based on the specified measurement period and information indicating whether the oxygen saturation satisfies the specified reference range on the display 360 or transmit the oxygen saturation and the information to an external device (e.g., another electronic device, the medical institution server 208-2, or the healthcare service server 209, which operates in conjunction with the electronic device 301). According to an embodiment, when the oxygen saturation does not satisfy the specified reference range (e.g., the state requiring a medical treatment), the processor 320 may transmit a signal (or message) requesting a treatment (or preferential treatment) to an external medical institution server (e.g., the medical institution server 208-2 of FIG. 2).

According to various embodiments, a method of measuring oxygen saturation based on a user context in an electronic device (e.g., the electronic device 101 of FIG. 1 or the electronic device 301 of FIG. 3) may include obtaining EMR data from an external server through a communication module of the electronic device, identifying oxygen saturation-related medical records based on the EMR data, based on occurrence of an event, determining a specified oxygen saturation measurement period and a specified reference oxygen saturation range based on the medical records, measuring oxygen saturation based on the specified oxygen saturation measurement period by using a biosensor of the electronic device, identifying whether the measured oxygen saturation satisfies the specified reference oxygen saturation range, and displaying the measured oxygen saturation and information indicating whether the measured oxygen saturation satisfies the specified reference oxygen saturation range on a display of the electronic device.

According to various embodiments, the specified oxygen saturation measurement period and the specified reference oxygen saturation range may be determined further based on an altitude value measured by a barometer of the electronic device.

According to various embodiments, the event may be a hospital entry event, and the method may further include, when the measured oxygen saturation does not satisfy the specified reference oxygen saturation range, transmitting a preferential treatment request message to an external medical institution server.

According to various embodiments, the method may further include receiving a response to the preferential treatment request message from the external medical institution server, and displaying information indicating that the preferential treatment request is accepted or a preferential treatment is unavailable based on the response on the display.

According to various embodiments, the method may further include transmitting the measured oxygen saturation to the external medical institution server based on the acceptance of the preferential treatment request.

According to various embodiments, the event may be a hospital exit event, and the method ma further include, when the measured oxygen saturation does not satisfy the specified reference oxygen saturation range, transmitting a re-treatment request message to the external medical institution server.

According to various embodiments, the method may further include, when the measured oxygen saturation does not satisfy the specified reference oxygen saturation range, transmitting the measured oxygen saturation to the external medical institution server.

According to various embodiments, the identifying of medical records may include identifying a user history of an oxygen saturation-related disease and/or a user history of severity of the oxygen saturation-related disease.

According to various embodiments, the oxygen saturation-related disease may include a respiratory disease or a lung disease.

Figure 8:
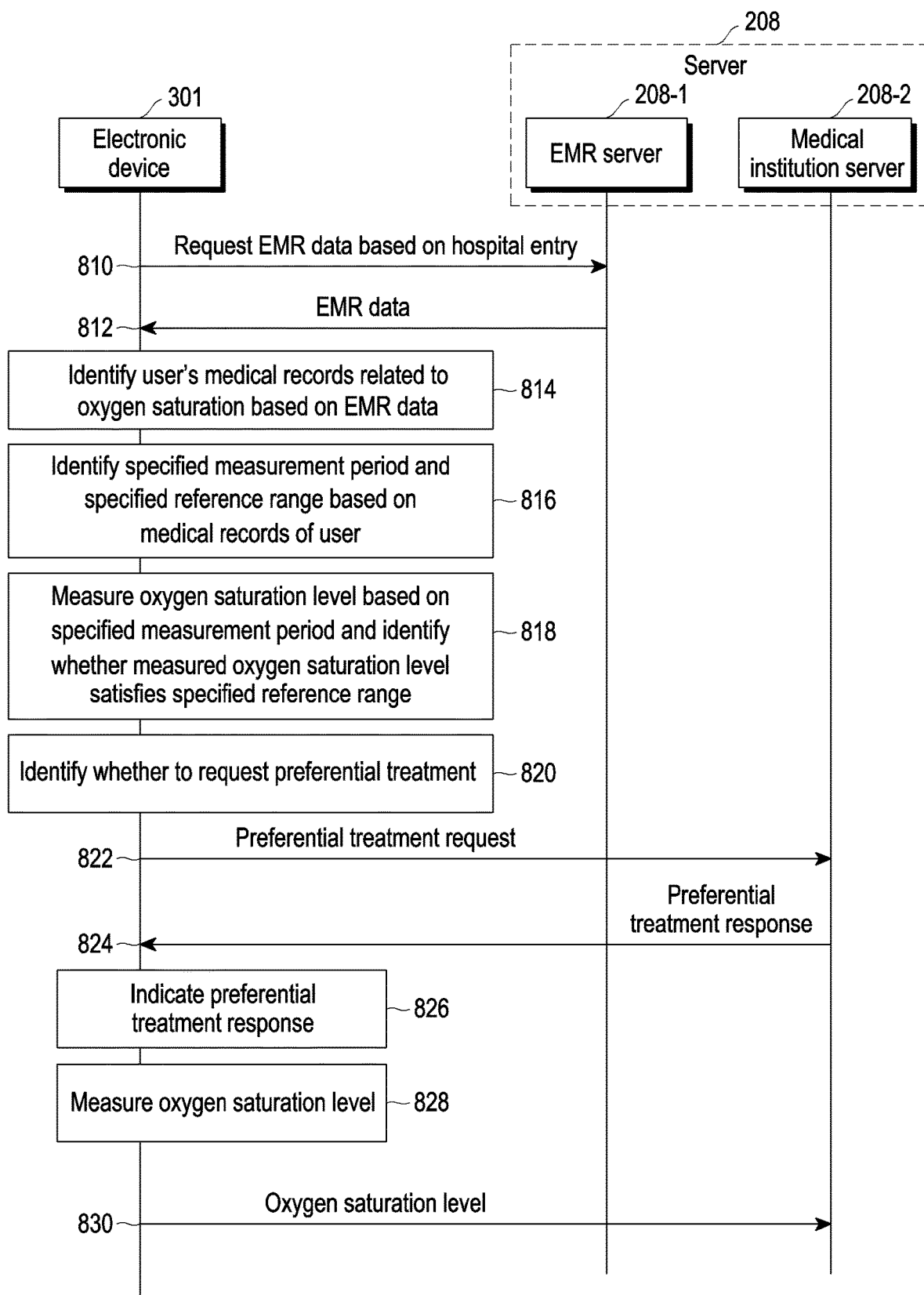
FIG. 8 is a flowchart illustrating an operation of requesting a preferential treatment by using oxygen saturation measurement based on EMR data, upon entry into a hospital in an electronic device according to an embodiment of the disclosure.

FIG. 8 is a flowchart illustrating an operation of requesting a preferential treatment by using oxygen saturation measurement based on EMR data, upon entry into a hospital in an electronic device according to an embodiment of the disclosure.

Referring to FIG. 8, a processor (e.g., the processor 120 of FIG. 1 or the processor 320 of FIG. 3) of an electronic device (e.g., the electronic device 101 of FIG. 1 or the electronic device 301 of FIG. 3) according to an embodiment may perform at least one of operations 810 to 830.

In operation 810, the processor 320 according to an embodiment may request EMR data from the server (e.g., hospital server) 208 based on identification of hospital entry. For example, the processor 320 according to an embodiment may identify whether a hospital has been entered by using the GPS module 374-4 or the communication module 390 (e.g., the UWB module 390-2 and/or the Bluetooth module 390-3). When identifying hospital entry, the processor 320 may request EMR data from the EMR server 208-1 of the hospital based on the hospital entry event. For example, the server 208 may be a single server serving as both of the EMR server 208-1 of the hospital and the medical institution server 208-2 of the hospital. In another example, the EMR server 208-1 and the medical institution server 208-2 may be independent servers. In FIG. 8, an example in which the EMR server 208-1 and the medical institution server 208-2 are independently implemented will be described.

In operation 812, the processor 320 according to an embodiment may receive the EMR data from the EMR server 208-1. For example, the EMR data may include PHR data (e.g., FHIR-based data), healthcare data, or various types of health-related or medical-related data.

In operation 814, the processor 320 according to an embodiment may identify medical records based on the received EMR data. For example, the processor 320 may identify whether there is disease information or treatment information related to oxygen saturation in the medical records. For example, the disease information related to oxygen saturation may be specify a respiratory disease or lung disease, and the treatment information related to oxygen saturation may be information related to a treatment of the respiratory disease or lung disease. For example, the processor 320 may identify whether the user has a history of an oxygen saturation-related disease (e.g., a respiratory disease, or a lung disease) based on the received EMR data and/or a severity history of the oxygen saturation-related disease. For example, when there is data (e.g., FAIR data) including a word or disease code (e.g., 359615001) associated with the disease information or treatment information related to oxygen saturation in the obtained EMR data of the user, the processor 320 may identify that the user has a history of an oxygen saturation-related disease, and identify a severity history of the oxygen saturation-related disease. In another example, the processor 320 may identify whether the user has a history of an oxygen saturation-related disease, and identify a history of severity (mild, severe, or risky) of the oxygen saturation-related disease based on the hospital medical records (e.g., a diagnosis result, a treatment process, and an aftercare method) included in the obtained EMR data of the user or information about a medicine prescribed to the user or purchased by the user included in the EMR data.

In operation 816, the processor 320 according to an embodiment may identify a specified oxygen saturation measurement period and a specified reference oxygen saturation range based on the medical records related to oxygen saturation. For example, when the user has a history of an oxygen saturation-related disease, the processor 320 may identify (select, determine, or change) an oxygen saturation measurement period and a reference oxygen saturation range to be a specified measurement period and a specified reference range for the oxygen saturation-related disease. For example, the processor 320 may identify (select, determine, or change to) the specified measurement period (a measurement period (e.g., the second (or third) measurement period) shorter than the measurement period (e.g., the first measurement period) for the daily life state) and the specified reference range (a reference range (e.g., the second (or third) reference range) lower than the reference range (e.g., the first reference range) for the daily life state) for the oxygen saturation-related disease corresponding to the history of the oxygen saturation-related disease and the severity history of the oxygen saturation-related disease.

In operation 818, the processor 320 according to an embodiment may measure oxygen saturation based on the specified measurement period and identify whether the measured oxygen saturation satisfies the specified reference range.

In operation 820, the processor 320 according to an embodiment may determine whether to request a preferential treatment based on whether the measured oxygen saturation satisfies the specified reference range. For example, when the measured oxygen saturation does not satisfy the specified reference range (a reference range (e.g., the second (or third) reference range) lower than the reference range (e.g., the first reference range) for the daily life state), the processor 320 may determine to request a preferential treatment. When the measured oxygen saturation satisfies the specified reference range (the reference range (e.g., the second (or third) reference range) lower than the reference range (e.g., the first reference range) for the daily life state), the processor 320 may determine not to request a preferential treatment.

In operation 822, the processor 320 according to an embodiment may transmit a preferential treatment request message to the medical institution server 208-2 based on the measured oxygen saturation not satisfying the specified reference range (the reference range (e.g., the second (or third) reference range) lower than the reference range (e.g., the first reference range) for the daily life state). For example, the processor 320 may transmit the measured oxygen saturation and the preferential treatment request message together to the medical institution server 208-2. According to an embodiment, upon receipt of the preferential treatment request message, the medical institution server 208-2 may provide the preferential treatment request message to medical personnel (e.g., a doctor, a nurse, or a medical receptionist). The medical institution server 208-2 may identify whether the medical personnel have accepted the preferential treatment request. When the preferential treatment request has been accepted or rejected, the medical institution server 208-2 may transmit a preferential treatment request response message to the electronic device 301, indicating acceptance or rejection of the preferential treatment request.

In operation 824, the processor 320 according to an embodiment may receive the preferential treatment request response message. For example, the processor 320 may receive a response message in response to the preferential treatment request message from the medical institution server 208-2 through the communication module 390. For example, the processor 320 may receive the response message from the medical institution server 208-2 by short-range communication such as Bluetooth (or Bluetooth low energy (BLE)), WiFi direct, or infrared data association (IrDA) through the communication module 390 or receive the response message from the medical institution server 208-2 by long-distance communication, such as a legacy cellular network, a 5G network, a next-generation communication network, the Internet, or a computer network (e.g., LAN or WAN). The response message may be a data type or a short message service (SMS) type.

In operation 826, the processor 320 according to an embodiment may notify the preferential treatment response based on the preferential treatment request response message. For example, the processor 320 may display information indicating whether the preferential treatment request has been accepted or rejected on the display 360 or output the information through a speaker. For example, when the preferential treatment request has been accepted, the processor 320 may display information indicating that the user's outpatient treatment order is designated with priority and/or information indicating the need for an emergency treatment and a first aid method on the display 360. For example, the processor 320 may output a warning sound so that persons around the user may be aware that the user needs a preferential treatment.

In operation 828, the processor 320 according to an embodiment may measure an oxygen saturation according to the specified measurement period based on the acceptance of the preferential treatment request. For example, the processor 320 may measure oxygen saturation according to the specified measurement period before the treatment starts.

In operation 830, the processor 320 according to an embodiment may transmit, to the medical institution server 208-2, the measured oxygen saturation. For example, the processor 320 may transmit the measured oxygen saturation to the medical institution server 208-2 to share the oxygen saturation measured according to the specified measurement period with the medical personnel. The processor 320 may further share environment and/or motion sensing information (value or numerical value) obtained by the at least one second sensor 374 at the time of the oxygen saturation measurement (e.g., a barometric pressure value, a temperature value, a humidity value, a location, a pressure value, an altitude value, a rotation direction and rotation angle, and/or proximity), motion sensing information, and/or information related to a user state (e.g., the exercise state, the sleep state, the walking state, or the daily life state), together with the measured oxygen saturation level.

Figure 9:
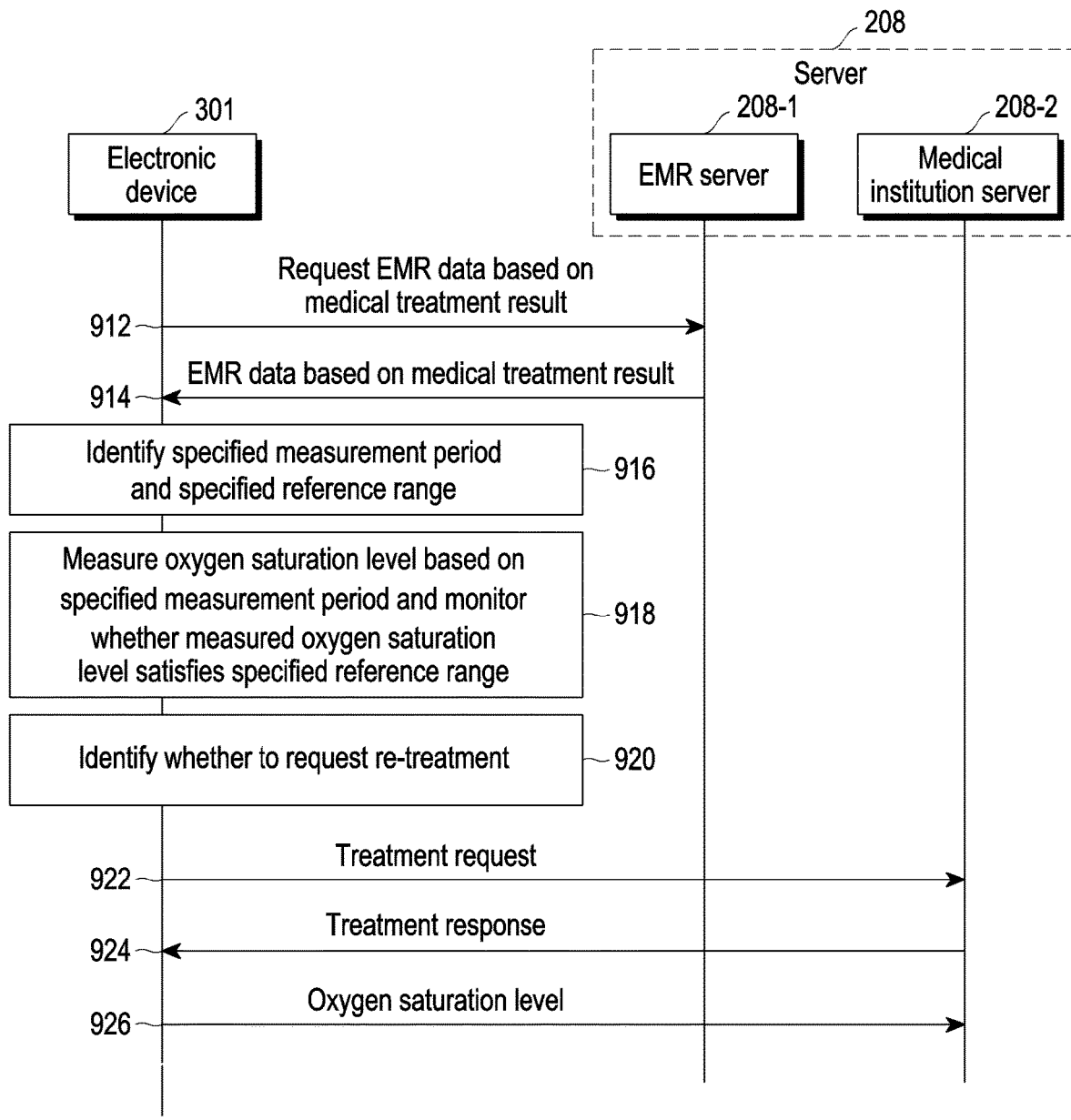
FIG. 9 is a flowchart illustrating a monitoring operation using oxygen saturation measurement based on EMR data, after exit from a hospital in an electronic device according to an embodiment of the disclosure.

FIG. 9 is a flowchart illustrating a monitoring operation using oxygen saturation measurement based on EMR data after hospital exit in an electronic device according to an embodiment of the disclosure.

Referring to FIG. 9, a processor (e.g., the processor 120 of FIG. 1 or the processor 320 of FIG. 3) of an electronic device (e.g., the electronic device 101 of FIG. 1 or the electronic device 301 of FIG. 3) according to an embodiment may perform at least one of operations 912 to 926.

In operation 912, the processor 320 according to an embodiment may request EMR data corresponding to a medical treatment result from the server (e.g., the hospital server) 208 based on identification of the hospital entry (hospital discharge or completion of medical treatment). For example, the processor 320 according to an embodiment may identify whether it has entered or left a hospital by using the GPS module 374-4 or the communication module 390 (e.g., the UWB module 390-2 and/or the Bluetooth module 390-3) or identify treatment completion based on a user input. When identifying hospital exit or treatment completion, the processor 320 may request EMR data from the EMR server 208-1 of the hospital based on the event of hospital entry or treatment completion.

In operation 914, the processor 320 according to an embodiment may receive the EMR data corresponding to the medical treatment result from the EMR server 208-1. The EMR data corresponding to the medical treatment result may include information about a history of an oxygen saturation-related disease and a history of severity of the oxygen saturation-related disease. The EMR data corresponding to the medical treatment result may include a specified measurement period and a specified reference range corresponding to the information about the history of the oxygen saturation-related disease and/or the history of severity of the oxygen saturation-related disease.

In operation 916, the processor 320 according to an embodiment may identify (or determine) a specified oxygen saturation measurement period and a specified reference oxygen saturation range based on the EMR data corresponding to the medical treatment result. For example, the EMR data corresponding to the medical treatment result may include a history of an oxygen saturation-related disease and/or a history of severity of the oxygen saturation-related disease. In another example, the EMR data corresponding to the medical treatment result may include a specified oxygen saturation measurement period and a specified reference oxygen saturation range corresponding to the history of the oxygen saturation-related disease and the severity history of the oxygen saturation-related disease. For example, the processor 320 may identify (select, determine, or change) an oxygen saturation measurement period and a reference oxygen saturation range as the specified measurement period and the specified reference range for the oxygen saturation-related disease. For example, the processor 320 may identify (select, determine, or change to) the specified measurement period (a measurement period (e.g., the second (or third) measurement period) shorter than the measurement period (e.g., the first measurement period) for the daily life state) and the specified reference range (a reference range (e.g., the second (or third) reference range) lower than the reference range (e.g., the first reference range) in the daily life state) for the oxygen saturation-related disease corresponding to the history of the oxygen saturation-related disease and the history of severity of the oxygen saturation-related disease, among a plurality of oxygen saturation measurement periods and a plurality of reference oxygen saturation ranges.

In operation 918, the processor 320 according to an embodiment may measure oxygen saturation based on the specified measurement period and monitor whether the measured oxygen saturation satisfies the specified reference range.

In operation 920, the processor 320 according to an embodiment may identify (or determine) whether to request a medical re-treatment based on whether the measured oxygen saturation satisfies the specified reference range. For example, when the measured oxygen saturation does not satisfy the specified reference range (a reference range (e.g., the second (or third) reference range) lower than the reference range (e.g., the first reference range) for the daily life state), the processor 320 may identify that a medical re-treatment is to be requested. When the measured oxygen saturation satisfies the specified reference range (the reference range (e.g., the second (or third) reference range) lower than the reference range (e.g., the first reference range) for the daily life state), the processor 320 may identify that a medical re-treatment is not to be requested.

In operation 922, when identifying that medical re-treatment is to be requested, the processor 320 according to an embodiment may transmit a re-treatment request message to the medical institution server 208-2.

In operation 924, the processor 320 according to an embodiment may measure oxygen saturation according to the specified measurement period based on the re-treatment request. In operation 926, the processor 320 may transmit the measured oxygen saturation to the medical institution server 208-2. For example, the processor 320 may transmit the oxygen saturation measured according to the specified measurement period to the medical institution server 208-2 until before the re-treatment starts, to share the measured oxygen saturation with the medical personnel until before the re-treatment. For example, the processor 320 may further share environment and/or motion sensing information (value or numerical value) obtained by the at least one second sensor 374 at the time of the oxygen saturation measurement (e.g., a barometric pressure value, a temperature value, a humidity value, a location, a pressure value, an altitude value, a rotation direction and rotation angle, and/or proximity), motion sensing information, and/or information related to a user state (e.g., the exercise state, the sleep state, the walking state, or the daily life state), together with the measured oxygen saturation level.

Figure 10A:
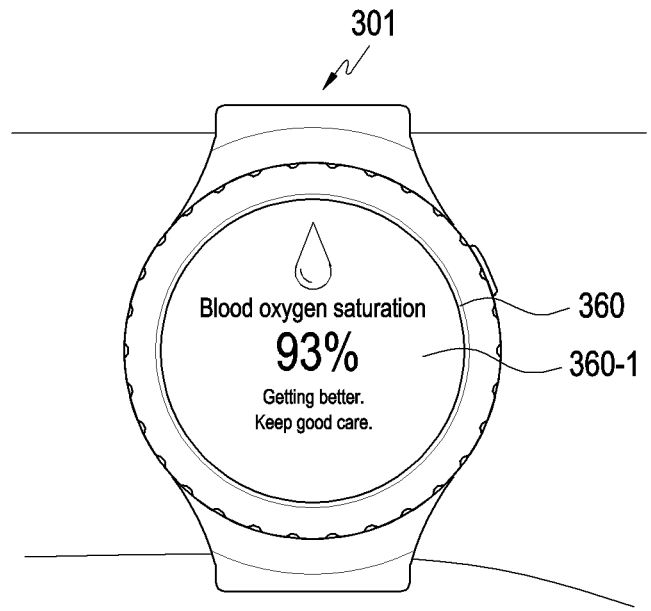
FIG. 10A is a diagram illustrating a first screen displayed when blood oxygen saturation is in a first state in an electronic device according to an embodiment of the disclosure.
Figure 10B:
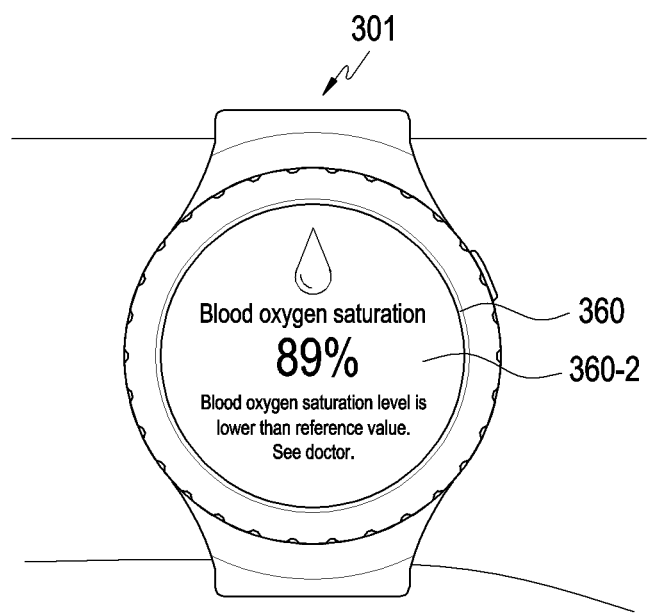
FIG. 10B is a diagram illustrating a second screen displayed when blood oxygen saturation is in a second state in an electronic device according to an embodiment of the disclosure.

FIG. 10A is a diagram illustrating a first screen displayed when blood oxygen saturation is in a first state in an electronic device according to an embodiment of the disclosure, and FIG. 10B is a diagram illustrating a second screen displayed when blood oxygen saturation is in a second state in an electronic device according to an embodiment of the disclosure.

Referring to FIGS. 10A and 10B, the processor 320 according to an embodiment may change an oxygen saturation measurement period and a reference oxygen saturation range to a default measurement period and a default reference range (e.g., change the first measurement period (e.g., 10 minutes) and the first reference range (e.g., 95% or higher) to a specified measurement period and reference range (e.g., the second measurement period (e.g., 1 minute) and the second reference range (e.g., 93 to 95% (for adults) or 94 to 98% for children) based on EMR data corresponding to a medical treatment result, monitor oxygen saturation, and display a monitoring result on the display 360.

Referring to FIG. 10A, when measured oxygen saturation is within a specified reference range (e.g., 93%) as a result of monitoring oxygen saturation, the processor 320 according to an embodiment may display a first screen 360-1 including a notification "Getting better. Keep good care".

Referring to FIG. 10B, when measured oxygen saturation does not fall within a specified reference range (e.g., 89%) as a result of monitoring oxygen saturation, the processor 320 according to an embodiment may display a second screen 360-2 including a notification "Blood oxygen saturation is lower than reference value. See doctor".

Figure 11:
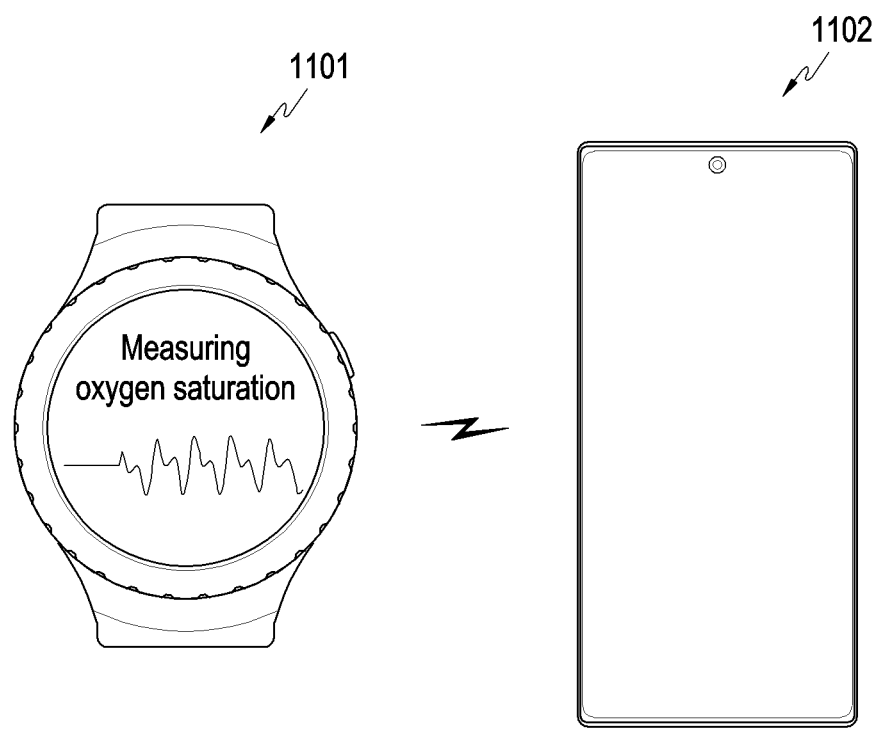
FIG. 11 is a diagram illustrating a wearable electronic device and a mobile communication terminal according to an embodiment of the disclosure.

FIG. 11 is a diagram illustrating a wearable electronic device and a mobile communication terminal according to an embodiment of the disclosure.

Referring to FIG. 11, at least a part of the components included in the electronic device 301 (e.g., the components of the electronic device 101 of FIG. 1 or the components of the electronic device of FIG. 3) according to an embodiment may be included in a wearable electronic device 1101 (e.g., a smart watch), and at least another part of the components included in the electronic device 301 (e.g., the components of FIG. 3) may be included in the mobile communication terminal 1102 (e.g., a smart phone). The wearable electronic device 1101 and the mobile communication terminal 1102 according to an embodiment may communicate with each other through short-range communication. The wearable electronic device 1101 may perform a part of the operations (e.g., the operations of FIGS. 6, 7, 8, and/or 9) of the electronic device 301, and the mobile communication terminal 1102 may perform another part of the operations (e.g., the operations of FIGS. 6, 7, 8, and/or 9) of the electronic device 301.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a non-volatile storage medium may store instructions which when executed by an electronic device, cause the electronic device to perform at least one operation. The at least one operation may include obtaining EMR data from an external server through a communication module of an electronic device, identifying oxygen saturation-related medical records based on the EMR data, based on occurrence of an event, determining a specified oxygen saturation measurement period and a specified reference oxygen saturation range based on the medical records, measuring oxygen saturation based on the specified oxygen saturation measurement period by using a biosensor of the electronic device, identifying whether the measured oxygen saturation satisfies the specified reference oxygen saturation range, and displaying the measured oxygen saturation and information indicating whether the measured oxygen saturation satisfies the specified reference oxygen saturation range on a display of the electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
communication circuitry;
a display;
a biosensor configured to measure oxygen saturation;
at least one processor; and
memory storing instructions which, when executed by the at least one processor, cause the electronic device to:
obtain medical record data of a user wearing the electronic device, and
identify whether a state of an oxygen saturation-related disease is in the medical record data, measure the oxygen saturation by using the biosensor,
wherein in case that a state of the oxygen saturation-related disease is not in the medical record data, the instructions cause the electronic device to:
identify a first cycle for measuring the oxygen saturation and a first reference oxygen saturation range,
measure first oxygen saturation based on the first cycle for measuring the oxygen saturation by using the biosensor, and
display the first oxygen saturation and first information indicating a relation between the first oxygen saturation and the first reference oxygen saturation range on the display,
wherein in case that the state of the oxygen saturation-related disease is in the medical record data, the instructions cause the electronic device to:
identify a second cycle for measuring the oxygen saturation and a second reference oxygen saturation range,
measure second oxygen saturation based on the second cycle for measuring the oxygen saturation by using the biosensor, and
display the second oxygen saturation and second information indicating a relation between the second oxygen saturation and the second reference oxygen saturation range on the display, and
wherein a duration of the second cycle is less than a duration of the first cycle and a value of the second reference oxygen saturation is less than a value of the first reference oxygen saturation.

2. The electronic device of claim 1, further comprising:
a barometer configured to measure an altitude,
wherein the instructions, when executed by the at least one processor, cause the electronic device to further adjust the first cycle and the second cycle based on an altitude value measured by the barometer.

3. The electronic device of claim 1,
wherein the instructions, when executed by the at least one processor, cause the electronic device to determine a hospital entry event,
wherein the medical record data of the user wearing the electronic device is obtained based on the determination of the hospital entry event, and
wherein the instructions, when executed by the at least one processor, cause the electronic device to transmit a preferential treatment request message to an external medical institution server, when the second oxygen saturation does not satisfy the second reference oxygen saturation range.

4. The electronic device of claim 3, wherein the instructions, when executed by the at least one processor, cause the electronic device to:
receive a response to the preferential treatment request message from the external medical institution server, and
display information indicating that the preferential treatment request is accepted or a preferential treatment is unavailable based on the response on the display.

5. The electronic device of claim 4, wherein the instructions, when executed by the at least one processor, cause the electronic device to transmit the second oxygen saturation to the external medical institution server based on acceptance of the preferential treatment request.

6. The electronic device of claim 1,
wherein the instructions, when executed by the at least one processor, cause the electronic device to determine a hospital exit event, wherein the medical record data of the user wearing the electronic device is obtained based on the determination of the hospital exit event, and wherein the instructions, when executed by the at least one processor, cause the electronic device to transmit a re-treatment request message to an external medical institution server, when the second oxygen saturation does not satisfy the second reference oxygen saturation range.

7. The electronic device of claim 6, wherein the instructions, when executed by the at least one processor, cause the electronic device to transmit the second oxygen saturation to the external medical institution server, when the second oxygen saturation does not satisfy the second reference oxygen saturation range.

8. The electronic device of claim 1, wherein the state of the oxygen saturation-related disease comprises at least one of a user history of the oxygen saturation-related disease or a user history of severity of the oxygen saturation-related disease.

9. The electronic device of claim 8, wherein the oxygen saturation-related disease includes a respiratory disease or a lung disease.

10. A method of measuring oxygen saturation based on a user context in an electronic device, the method comprising:
obtaining medical record data of a user wearing the electronic device; and
identifying whether a state of an oxygen saturation-related disease is in the medical record data, measuring the oxygen saturation,
wherein based on a state of the oxygen saturation-related disease not being in the medical record data, the measuring the oxygen saturation includes:
identifying a first cycle for measuring the oxygen saturation and a first reference oxygen saturation range;
measuring first oxygen saturation based on the first cycle for measuring the oxygen saturation by using a biosensor of the electronic device; and
displaying the first oxygen saturation and first information indicating a relation between the first oxygen saturation and the first reference oxygen saturation range on a display of the electronic device,
wherein based on the state of the oxygen saturation-related disease being in the medical record data, the measuring the oxygen saturation includes:
identifying a second cycle for measuring the oxygen saturation and a second reference oxygen saturation range;
measuring second oxygen saturation based on the second cycle for measuring the oxygen saturation by using the biosensor of the electronic device; and
displaying the second oxygen saturation and second information indicating a relation between the second oxygen saturation and the second reference oxygen saturation range on the display, and
wherein a duration of the second cycle is less than a duration of the first cycle and a value of the second reference oxygen saturation is less than a value of the first reference oxygen saturation.

11. The method of claim 10, wherein the first cycle and the second cycle are further adjusted based on an altitude value measured by a barometer of the electronic device.

12. The method of claim 10,
wherein the method further comprises determining a hospital entry event,
wherein the medical record data of the user wearing the electronic device is obtained based on the determining of the hospital entry event, and
wherein the method further comprises, when the second oxygen saturation does not satisfy the second reference oxygen saturation range, transmitting a preferential treatment request message to an external medical institution server.

13. The method of claim 12, further comprising:
receiving a response to the preferential treatment request message from the external medical institution server; and
displaying information indicating that the preferential treatment request is accepted or a preferential treatment is unavailable based on the response on the display.

14. The method of claim 13, further comprising:
transmitting the second oxygen saturation to the external medical institution server based on the acceptance of the preferential treatment request.

15. The method of claim 10,
wherein the method further comprises determining a hospital exit event,
wherein the medical record data of the user wearing the electronic device is obtained based on the determining of the hospital exit event, and
wherein the method further comprises, when the second oxygen saturation does not satisfy the second reference oxygen saturation range, transmitting a re-treatment request message to an external medical institution server.

16. The method of claim 15, further comprising:
when the second oxygen saturation does not satisfy the second reference oxygen saturation range, transmitting the second oxygen saturation to the external medical institution server.

17. The method of claim 10, wherein the state of the oxygen saturation-related disease comprises at least one of a user history of the oxygen saturation-related disease or a user history of severity of the oxygen saturation-related disease.

18. The method of claim 17, wherein the oxygen saturation-related disease includes a respiratory disease or a lung disease.

19. A non-transitory storage medium storing instructions which when executed by an electronic device, cause the electronic device perform at least operations comprising:
obtaining medical record data of a user wearing an electronic device; and
identifying whether a state of an oxygen saturation-related disease is in the medical record data, measuring the oxygen saturation,
wherein based on a state of the oxygen saturation-related disease not being in the medical record data, the measuring the oxygen saturation includes:
identifying a first cycle for measuring the oxygen saturation and a first reference oxygen saturation range;
measuring first oxygen saturation based on the first cycle for measuring the oxygen saturation by using a biosensor of the electronic device; and
displaying the first oxygen saturation and first information indicating a relation between the first oxygen saturation and the first reference oxygen saturation range on a display of the electronic device,
wherein based on the state of the oxygen saturation-related disease being in the medical record data, the measuring the oxygen saturation includes:

identifying a second cycle for measuring the oxygen saturation and a second reference oxygen saturation range;

measuring second oxygen saturation based on the second cycle for measuring the oxygen saturation by using the biosensor of the electronic device; and displaying the second oxygen saturation and second information indicating a relation between the second oxygen saturation and the second reference oxygen saturation range on the display, and wherein a duration of the second cycle is less than a duration of the first cycle and a value of the second reference oxygen saturation is less than a value of the first reference oxygen saturation.

20. The non-transitory storage medium of claim 19, wherein the oxygen saturation-related disease comprises at least one of a user history of an oxygen saturation-related disease or a user history of severity of the oxygen saturation-related disease.

* * * * *